US006526521B1

United States Patent
Lim

(10) Patent No.: US 6,526,521 B1
(45) Date of Patent: Feb. 25, 2003

(54) METHODS AND APPARATUS FOR PROVIDING DATA STORAGE ACCESS

(75) Inventor: James B. Lim, Framingham, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 09/336,461

(22) Filed: Jun. 18, 1999

(51) Int. Cl.[7] .................................................. G06F 11/16
(52) U.S. Cl. .......................................... 714/4; 709/239
(58) Field of Search ............................. 714/4–5, 43, 55; 709/235, 239

(56) References Cited

U.S. PATENT DOCUMENTS

| | | | | |
|---|---|---|---|---|
| 5,754,120 A | * | 5/1998 | Argentati ..................... | 340/876 |
| 6,003,090 A | * | 12/1999 | Puranik et al. .............. | 709/235 |
| 6,084,858 A | * | 7/2000 | Matthews et al. ........... | 370/238 |

* cited by examiner

Primary Examiner—Scott Baderman
(74) Attorney, Agent, or Firm—David E. Huang, Esq.; Chapin & Huang, L.L.C.

(57) ABSTRACT

A technique provides access to data storage pathways that connect a cluster of nodes to a data storage system in a manner that enables a failover operation to occur from a first node to a second node when the first node suffers pathway degradation forcing the first node to operate significantly slower than previously, even when the first node retains access to the data storage system through one or more available data storage pathways. Such a failover operation from the degraded first node to a second node allows the cluster as a whole to continue performing operations at a rate that is superior to that provided by the degraded first node. In one arrangement, a cluster of nodes connects to the data storage system through multiple sets of data storage pathways. A cluster framework and a set of pathway resource agents operate on the cluster of nodes. In particular, a respective portion of the cluster framework and a respective pathway resource agent operate on each node. The pathway resource agents receive, from the cluster framework, instructions for controlling the pathway sets and, in response, determine which of the pathway sets are available for transferring data between the cluster of nodes and the data storage system in accordance with predetermined access conditions. The pathway resource agents then provide, to the cluster framework, operation states identifying which of the pathway sets are available for transferring data between the cluster of nodes and the data storage system in accordance with the predetermined access conditions. The cluster framework can then access the pathway sets based on the operation states.

38 Claims, 10 Drawing Sheets

METHODS AND APPARATUS FOR PROVIDING DATA STORAGE ACCESS

FIELD OF THE INVENTION

The invention relates generally to data storage resource management within a computer system. More particularly, the invention relates to techniques for providing access to data storage pathways which connect a cluster of nodes to a data storage system.

BACKGROUND OF THE INVENTION

A typical general purpose computer includes a processor, primary memory (e.g., semiconductor memory), secondary memory (e.g., disk memory) and one or more input/output (I/O) devices (e.g., a keyboard, printer, or network interface). Such a computer is generally suitable for situations in which occasional computer downtime does not cause serious problems (e.g., when the computer operates as a website server for advertising, or when the computer is used for playing games).

However, in some situations, even occasional downtime may cause serious problems. For example, in the banking industry, banks risk losing substantial business and goodwill if customers are unable to access their computerized accounts. Similarly, in the travel industry, companies (e.g., hotels, airlines, etc.) stand to lose significant business and will likely sustain damage to their reputations if their computerized reservation records become unavailable. Moreover, certain types of operations (e.g., satellites, nuclear power plants, and government military systems) are controlled by computerized systems, and the loss of such computerized control can be catastrophic.

To improve computer system reliability, computer manufacturers have developed fault-tolerant computer systems. Fault tolerance is a strategy for ensuring that such systems provide continued operation even when certain types of faults arise. One fault-tolerant computer system includes a host computer (or simply host or node), a fault-tolerant data storage system, and a fault-tolerant cabling system that connects the host to the data storage system. In general, the fault-tolerant data storage system includes multiple disks which store data in a manner that enables the data storage system to recover the data if a disk should fail. Various techniques for storing data on multiple disks in order to provide for reliable data recovery in the event of a disk failure are described in Patterson et al., "A Case for Redundant Arrays of Inexpensive Disks (RAID)," ACM SIGMOND Conference, Jun. 1–3, 1988, the teachings of which are incorporated herein by reference in their entirety. An example of a fault-tolerant data storage system that uses RAID is Symmetrix, which is manufactured by EMC Corporation of Hopkinton, Mass.

In general, the fault-tolerant cabling system includes multiple cables that provide multiple data storage pathways between the host and the data storage system. If a cable is cut or otherwise damaged, the remaining cables will provide continued connectivity between the host and the data storage system. Additionally, traffic through the cables can be load balanced to further enhance data exchange efficiency between the host and the data storage system. An example of such a cabling system is PowerPath, which is manufactured by EMC Corporation of Hopkinton, Mass.

Another example of a fault-tolerant computer system is a cluster of computerized nodes. Each node runs one or more applications to perform a set of operations. If the cluster is configured to provide failover protection in the event of a node failure and if a first node of the cluster fails (e.g., due to a hardware failure, or a failure of all the data storage pathways connecting the first node to a data storage system), a second node that continues to run typically will detect the loss of the first node (e.g., by exceeding a timeout period in which the second node expected to receive a handshaking signal from the first node). The second node will then automatically restart and run the applications that ran on the first node. The automatic migration of an application from the first node to the second node due to the failure of the first node is called a failover operation. Since such migration will enable the second node to continue performing the operations initially performed by the first node, the cluster as a whole will remain operational even though the first node will have failed.

SUMMARY OF THE INVENTION

In a conventional cluster of nodes, a first node may fail due to a complete failure of all the data storage pathways connecting the first node to a data storage system. If the cluster is configured to provide failover protection, a second node of the cluster typically will detect this failure by determining that the first node has not provided an expected signal within a timeout period (i.e., the first node has timed out). The second node will then automatically restart and run applications that initially ran on the first node in order for the cluster to remain operational.

There may be occasions when the first node does not completely fail but suffers degradation in its processing rate. In such a situation, the first node may continue to provide the expected signal, the loss of which would have enabled the second node to determine that the first node had failed. For example, suppose that the set of data storage pathways connecting the first node to the data storage system experiences congestion problems. Perhaps, the majority of data storage pathways in the set of data storage pathways are cut or damaged and thus become unavailable for data transfer. The first node may remain operational by routing data traffic, which would have normally passed through the unavailable data storage pathways, through the remaining intact data storage pathways. Although, at this point, the throughput or processing speed of the first node may be significantly reduced or limited by data congestion through the remaining intact data storage pathways, the first node continues to perform its original operations at a substantially reduced rate and prevents a timeout or failover condition from occurring (e.g., by providing appropriate handshaking signals to other nodes of the cluster).

In contrast to conventional mechanisms that perform failover operations when cluster nodes become unavailable but that avoid such failover operations when the nodes continue to operate at reduced rates, the invention is directed to techniques for providing access to data storage pathways that connect a cluster of nodes to a data storage system in a manner that enables a failover operation to occur from a first node to a second node when the first node suffers pathway degradation forcing the first node to operate significantly slower than previously, even when the first node retains access to the data storage system through one or more available data storage pathways. Such a failover operation from the degraded first node to the second node allows the cluster to continue performing operations at a rate that is superior to that provided by the degraded first node.

In accordance with an embodiment of the invention, a cluster of nodes connects to a data storage system through multiple sets of data storage pathways. A cluster framework and a set of pathway resource agents operate on the cluster of nodes. In particular, a respective portion of the cluster framework and a respective pathway resource agent operate on each node. The pathway resource agents receive, from the cluster framework, instructions for controlling the pathway sets and, in response, determine which of the pathway sets are available for transferring data between the cluster of nodes and the data storage system in accordance with predetermined access conditions. The pathway resource agents then provide, to the cluster framework, operation states identifying which of the pathway sets are available for transferring data between the cluster of nodes and the data storage system in accordance with the predetermined access conditions. The cluster framework can then access the pathway sets based on the operation states.

Preferably, the predetermined access conditions include, for each node, a data storage pathway availability threshold. In one arrangement, the threshold for each node is a minimum percentage of the set of data storage pathways that must be available to that node in order for the pathway set to be considered available for data transfer. In another arrangement, the threshold for each node is a minimum number of pathways of the pathway set that must be available to that node in order for the pathway set to be considered available for data transfer. In yet another arrangement, the thresholds are minimum percentages for some nodes, and minimum numbers for other nodes.

For example, suppose the predetermined access conditions include a minimum percentage threshold of 50% for a first node, and further suppose that there is a set of five data storage pathways connecting the first node to the data storage system. When more than 50% of the data storage pathways are available for transferring data between the first node and the data storage system (i.e., when three or more pathways are available), a pathway resource agent running on the first node provides an online operation state to a portion of the cluster framework running on the first node indicating that the pathway set is available for transferring data in accordance with the predetermined access conditions.

However, if less than 50% of the data storage pathways are available for transferring data between the first node and the data storage system (i.e., when two or less pathways are available), the pathway resource agent running on the first node provides a non-online operation state (e.g., an offline or faulted operation state) to a portion of the cluster framework running on the first node indicating that the pathway set is not available for transferring data in accordance with the predetermined access conditions. In this situation, the pathway resource agent indicates to the cluster framework that the pathway set, as a whole, is unavailable even through there may be one or more data storage pathways that are available. The cluster framework can then failover any applications running on the first node to a second node that connects to the data storage system. Accordingly, any data storage pathway degradation that reduces the operating rate of the first node can be avoided, and the applications that originally ran on the first node can run on the second node (e.g., a non-degraded or less degraded node) at a potentially faster operating rate.

Additionally, the pathway resource agents are preferably configured to issue a warning signal to the cluster framework when a percentage or number of a particular set of data storage pathways available for transferring data between a particular node and the data storage system decreases from a value that is greater than or equal to a pre-established warning threshold (a percentage or number) to a value that is lower than the pre-established warning threshold. Suppose, in the example above, that the predetermined access condition includes a warning threshold of 75% associated with the first node. If 75% or more of the five data storage pathways connecting the first node to the data storage system are available (i.e., four or more), the pathway resource agent running on the first node does not send a warning signal to the cluster framework. However, if percentage of available pathways drops below 75% (i.e., three or less), the pathway resource agent running on the first node provides a warning signal to the cluster framework. Accordingly, the cluster framework receives notification that the set of data storage pathways connecting the first node to the data storage system has dropped to a potentially critical level where further pathway deterioration could result in the pathway set becoming unavailable. As a result, a system administrator monitoring the cluster may be able to rectify any problem with the pathway set before the pathway set is deemed unavailable.

Suppose that the number of available pathways in the pathway set drops from five to three (60% available) triggering the pathway resource agent running on the first node to issue the warning signal to the cluster framework. If the problem with the pathway set is not rectified and another data storage pathway becomes unavailable, the number of available pathways will drop further to two. That is, the percentage of available pathways will drop from 60% to 40% thus crossing the 50% minimum percentage threshold described previously. Although the first node can still exchange data with the data storage system through the remaining two data storage pathways, the pathway resource agent provides the cluster framework with a faulted operation state indicating that the pathway set is now unavailable as a data storage resource. Accordingly, the cluster framework can respond by performing a set of failover operations to migrate applications running on the first node to other nodes (e.g., the second node).

In accordance with the invention, the cluster framework can direct the pathway resource agents to make a set of data storage pathways unavailable. For example, suppose that the cluster framework detects a failure in a portion of the data storage system used by the first node. The cluster framework can send an instruction to the pathway resource agent running on the first node directing the first node to make unavailable the set of data storage pathways connecting the first node to the data storage system. In response, the pathway resource agent preferably provides, as an operation state corresponding to the particular set of data storage pathways, an offline state to the cluster framework. The offline state indicates to the cluster framework that the pathway set is no longer available for transferring data between the particular node and the data storage system in accordance with the predetermined access conditions.

The pathways agents operate on the nodes of the cluster. A benefit to running pathway resource agents on the cluster nodes rather than another location such as processing circuitry in the data storage system is that communications between the pathway resource agents and the cluster framework (which also runs on the nodes of the cluster) do not need to pass through the data storage pathways, or alternatively, another communications medium. Rather, such communication can be isolated within the nodes themselves without consuming other resources.

In contrast to the earlier described embodiment in which the nodes of the cluster are configured (using pathway resource agents) to provide operation states to the cluster framework indicating pathway set availability, another embodiment is directed to a data storage system having (i) multiple sets of data storage pathways that connect to a cluster of nodes, and (ii) an interface, coupled to the pathway sets, that provides operation states to a cluster framework running on the cluster of nodes. In this arrangement, the interface receives, from the cluster framework, instructions for controlling the pathway sets. In response to the instructions, the interface determines which of the pathway sets are available for transferring data between the cluster of nodes and the data storage system in accordance with predetermined access conditions. The interface further provides, to the cluster framework, operation states identifying which of the pathway sets are available for transferring data between the cluster of nodes and the data storage system in accordance with the predetermined access conditions. The cluster of nodes, under control of the cluster framework, accesses the data storage pathways based on the operation states. Preferably, the interface supplies, for each node of the cluster, an operation state indicating whether a set of data storage pathways connecting that node to the data storage system is available for transferring data between that node and the data storage system in accordance with the predetermined access conditions.

A benefit to having an interface within the data storage system to provide the operation states is that the burden of running pathway resource agents is removed from the nodes of the cluster. Although the operation states must be conveyed to the nodes through the data storage pathways or another communication medium, cluster node processing cycles that would otherwise be used for the pathway resource agents are free to perform other operations.

Another embodiment of the invention is directed to a computer program product that includes a computer readable medium having commands stored thereon. The commands, when processed by a cluster of nodes connected to a data storage system through multiple sets of data storage pathways, cause the cluster to receive, from a cluster framework operating on the cluster, instructions for controlling the pathway sets. Additionally, the commands cause the cluster to determine, in response to the instructions, which of the pathway sets are available for transferring data between the cluster of nodes and the data storage system in accordance with predetermined access conditions. Furthermore, the commands cause the cluster to provide, to the cluster framework, operation states identifying which of the pathway sets are available for transferring data between the cluster of nodes and the data storage system in accordance with the predetermined access conditions. The cluster of nodes accesses the data storage pathways based on the operation states.

In one arrangement, the computer program product further includes cluster framework code such that the commands are bundled with the cluster framework. In another arrangement, the computer program product further includes operating system code such that the commands are bundled with the cluster operating system. In another arrangement, the computer program product is packaged separately from the cluster framework and the cluster operating system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Overview

The invention is directed to techniques for providing access to data storage pathways that connect a cluster of computerized nodes (or hosts) to a data storage system using operation states that indicate availability of data storage pathway sets. An operation state may indicate that a pathway set is unavailable for transferring data in accordance with predetermined access conditions even though the pathway set includes at least one data storage pathway that is available for transferring data. As a result, the cluster can migrate (e.g., in a failover manner) applications from a first node experiencing data storage pathway degradation to a second node even if the first node remains operational at a reduced operating rate (due to the pathway degradation). Accordingly, migrated applications can operate free of such degradation on the second node. Such operation may be particularly useful in fault-tolerant cluster settings such as those manufactured and provided by EMC Corporation of Hopkinton, Mass.

Figure 1:
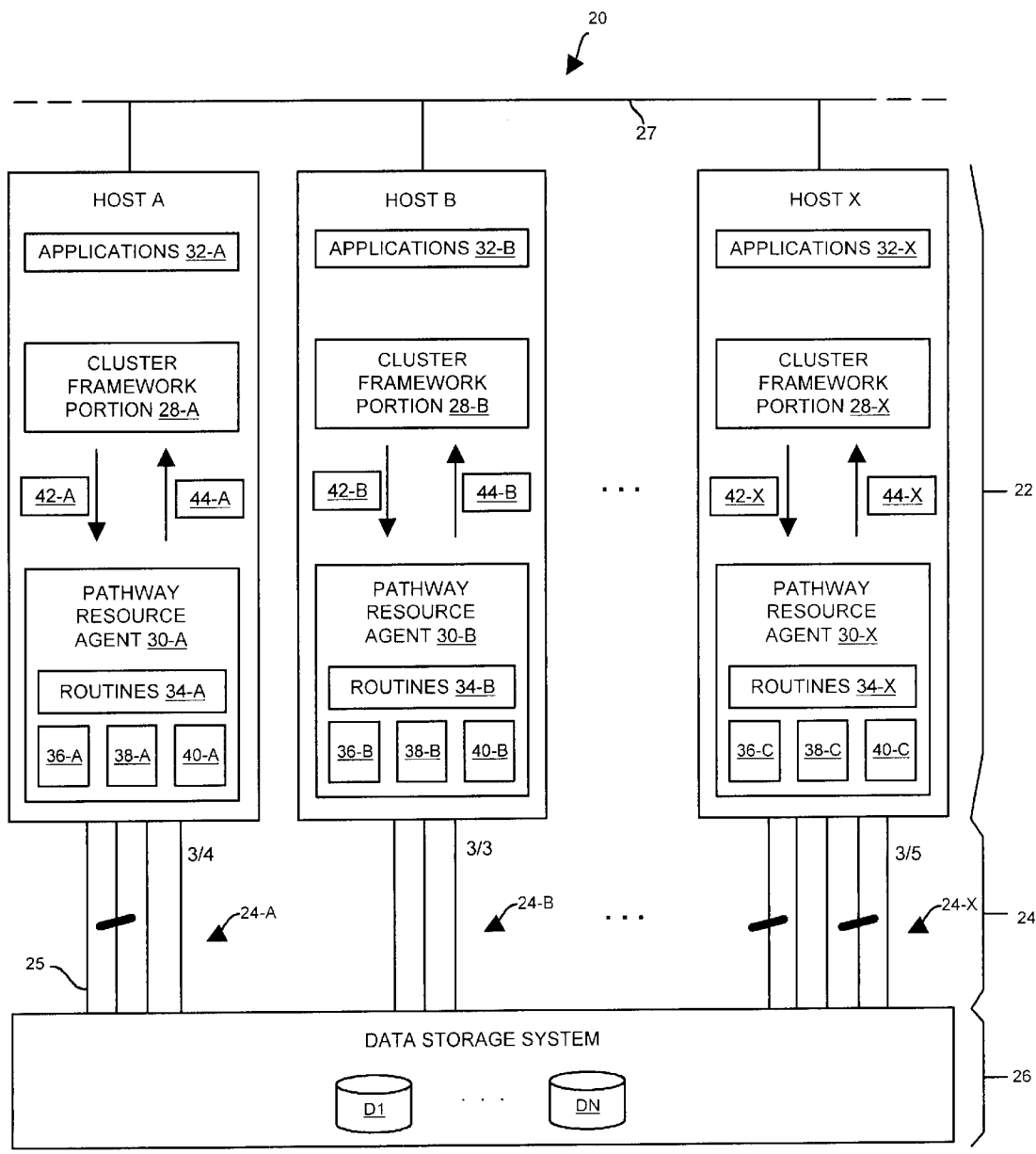
FIG. 1 is a block diagram showing a computer system configured according to the invention.

FIG. 1 shows a computer system 20 that is suitable for use by the invention. The computer system 20 includes multiple hosts 22 (e.g., HOST A, HOST B, . . . , HOST X), multiple sets of data storage pathways 24 (e.g., 24-A, 24-B, . . . , 24-X), and a data storage system 26. The hosts 22 communicate with the data storage system 26 through the pathway sets 24, and with each other through a separate communications medium 27 (e.g., an Ethernet link).

Each set of data storage pathways 24 connects a particular host 22 to the data storage system 26. For example, HOST A connects to the data storage system 26 through pathway set 24-A, which has four data storage pathways 25. Similarly, HOST B connects to the data storage system 26 through pathway set 24-B, which has three pathways 25. Additionally, HOST X connects to the data storage system 26 through pathway set 24-X, which has five pathways 25.

When the computer system 20 is in operation, a cluster framework 28, pathway resource agents 30 and applications 32 run on the hosts 22. In particular, a cluster framework portion 28-A, a pathway resource agent 30-A and applications 32-A run on HOST A, a cluster framework portion 28-B, a pathway resource agent 30-B and applications 32-B run on HOST B, and so on. Preferably, the pathway resource agents 30 run as processes on the nodes 22. Additionally, the agents 30 preferably are configured as either executable code or scripts that run from entry points from the cluster framework portions 28. Executable code provides certain advantages over scripts such as preventing alteration of the agents, providing portability, and multi-threaded operability.

On each node 22, the respective pathway resource agent 30 includes a set of routines 34, a predetermined access condition data structure 36 that stores one or more predetermined access conditions for the pathway set 24 connecting that node 22 to the data storage system 26, an existing pathway data structure 38 that stores the number of pathways 25 in the pathway set 24, and an available pathway data structure 40 that stores the number of pathways 25 in the pathway set 24 which are available to transfer data between that node 22 and the data storage system 26. For example, on HOST A, pathway resource agent 30-A includes a set of routines 34-A, a predetermined access condition data structure 36-A that indicates a predetermined access condition for the pathway set 24-A connecting HOST A to the data storage system 26, an existing pathway data structure 38-A indicating the number of data storage pathways 25 connecting HOST A to the data storage system 26 (e.g., four), and an available pathway data structure 40-A indicating the number of pathways 25 which are available to transfer data between HOST A and the data storage system 26 (e.g., three, since one of the four existing pathways has failed). Further details of the predetermined access conditions will be provide shortly with reference to FIG. 5.

When the computer system 20 is in operation, the cluster framework 28 sends pathway resource agent instruction signals 42 to the pathway resource agents 30. In response to the instruction signals 42, the routines 34 of the pathway resource agents 30 access the contents of the data structures 36, 38, 40 and return pathway resource agent response signals 44 to the cluster framework 28. The response signals 44 provide the cluster framework 28 with information (e.g., operation states) regarding the availability of the pathway sets 24 that transfer data between the nodes 22 and the data storage system 26.

Figure 2:
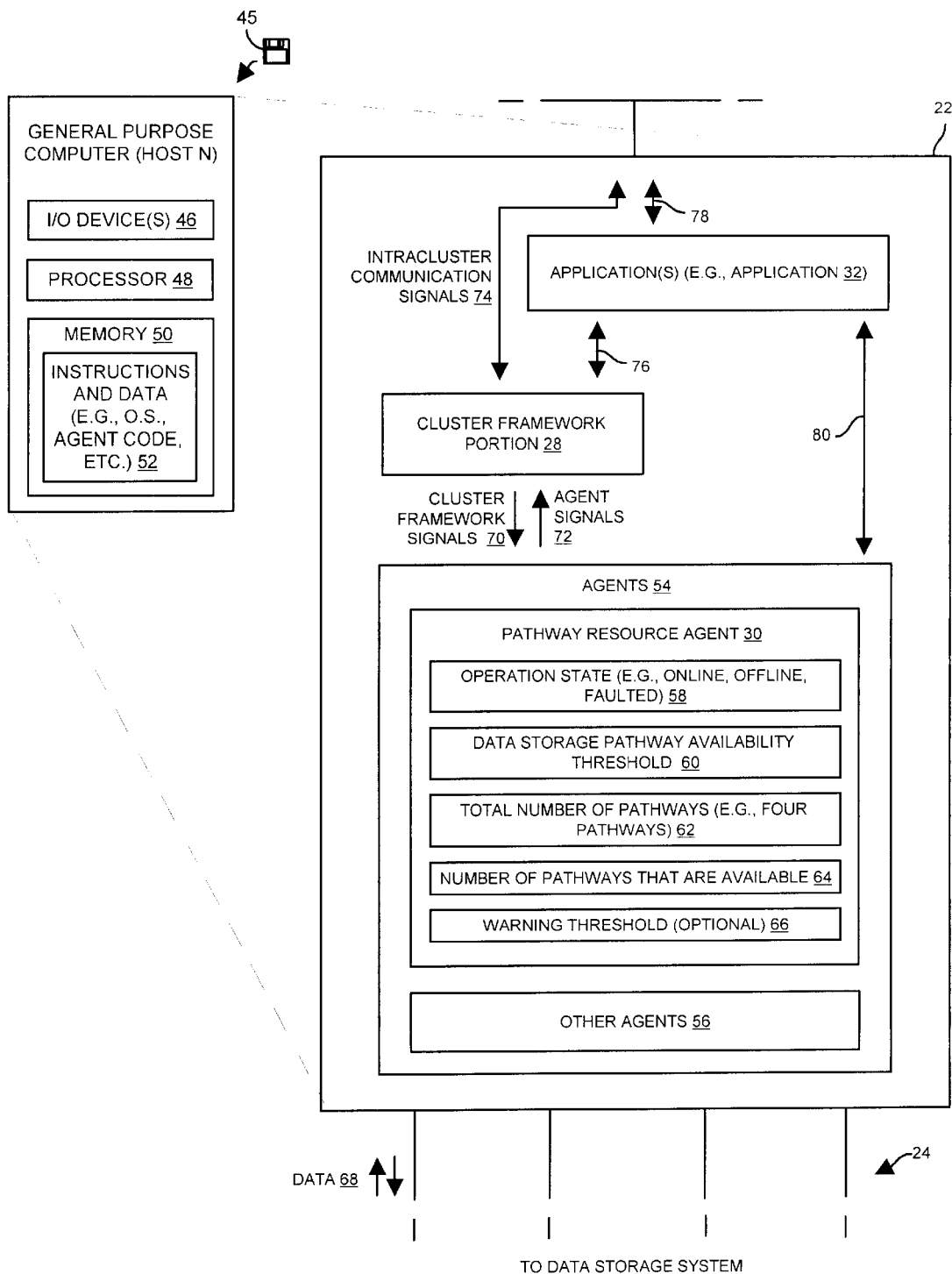
FIG. 2 is block diagram showing a host of the computer system shown in FIG. 1.

Further details of each node 22 will now be provided with reference to FIG. 2. Preferably, each node 22 is a general purpose computer having, among other things, one or more input/output devices 46 (keyboard/monitor, network interface, etc.), a processor 48 (one or more processing devices), and memory 50. The memory 50 stores instructions and data 52 (e.g., operating system code, pathway resource agent code, cluster framework code, etc.) which are used by the processor 48. In one arrangement, the instructions and data 52 originate from an external source such as a computer program product 45 having a computer readable medium (magnetic tape, diskettes, etc.). In another arrangement, the instructions and data 52 download from a server (e.g., through the network). Preferably, the instructions and data 52 then reside in the data storage system 26 and/or the memory 50 of each node 22.

As shown in FIG. 2, each node 22 has a set of agents 54 including a pathway resource agent 30 which is associated with the set of data storage pathways 24 connecting that node 22 with the data storage system 26, and perhaps other agents 56 that are associated with other services or resources of the computer system 20. For example, the set of agents 54 may include an agent associated with the data storage system 26.

The pathway resource agent 30 keeps track of an operation state 58 (e.g., online, offline and faulted) for the pathway set 24 which it provides to the cluster framework portion 28 upon request, a data storage pathway availability threshold 60 (a minimum percentage or number as a predetermined access condition for that pathway set 24), the total number of pathways 25 in that pathway set 24, and the number of pathways 25 in that pathway set 24 that are available for transferring data 68 between the node 22 and the data storage system 26. Preferably, the pathway resource agent 30 further has access to a warning threshold 66 (another access condition). This information is stored in data structures in the memory 50 (see data structures 36, 38, 40 in FIG. 1).

When the node 22 is in operation, the cluster framework portion 28 provides cluster framework signals 70 (e.g., pathway resource agent instruction signals 42, see FIG. 1) to the agents 54. Additionally, the agents 54 provide agent signals 72 to the cluster framework portion 28 (e.g., pathway resource agent response signals 44, see FIG. 1).

Furthermore, each cluster framework portion 28 communicates with other cluster framework portions 28 on other nodes 22 using intracluster communication signals 74 (e.g., heartbeat signals informing the other cluster framework portions 28 of that cluster framework portion's existence and status).

The applications 32 running on the node 22 can communicate with the cluster framework portion 28 (via signals 76). For example, the cluster framework portion 28 can direct an application 32 to shutdown or startup as part of a failover operation based on the availability of certain data storage resources such as the pathway set 24 or the data storage system 26.

Similarly, the applications 32 can communicate with external devices (via signals 78). For example, an application 32 may provide signals to other cluster nodes 22, or devices external to the computer system 20 (e.g., an e-mail message).

Additionally, the applications 32 can communicate with the agents 54 directly (via signals 80). For example, the pathway resource agent 30 can determine the number of pathways 25 in the pathway set 24 and the number of available pathways 25 in the pathway set 24 through system calls to the operating system or by calling a special utility program (i.e., an application 32). Furthermore, the applications 32 as well as other entities running on the node 22 can exchange data 68 with the data storage system 26.

The cluster framework portions 28 running on the nodes 22 collectively operate to manage resources of the computer system 20. In particular, the cluster framework 28 can detect the loss of a particular resource and signal applications that are dependent on the lost resource in order to trigger certain fault-tolerant operations. For example, if the cluster framework 28 detects the loss of the pathway set 24 for a particular node 22, the cluster framework 28 can perform a failover operation for an application that depended on the lost pathway set 24. Further details of the cluster framework 28 will now be provided with reference to FIG. 3.

Figure 3:
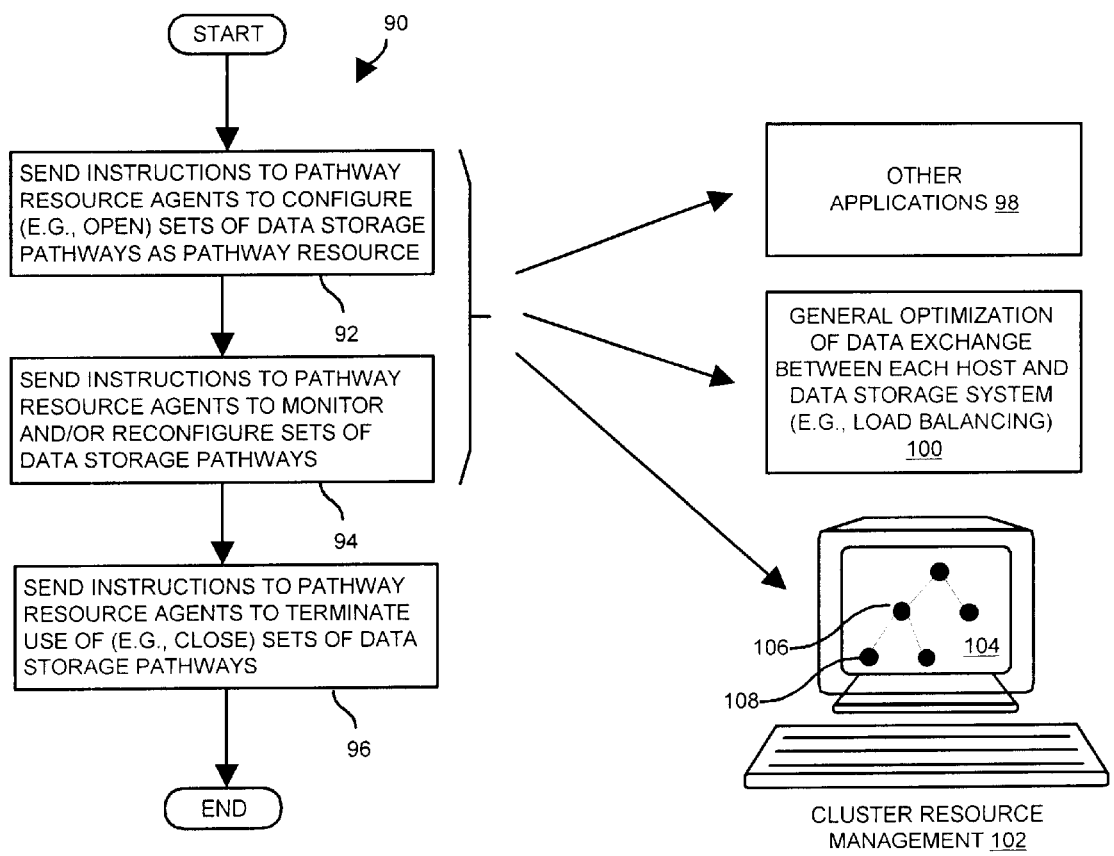
FIG. 3 is a flow chart illustrating the operation of a cluster framework of the computer system shown in FIG. 1.

As shown in FIG. 3, the cluster framework 28 performs a procedure 90 to utilize a data storage resource of the computer system 20 (e.g., the sets of data storage pathways 24). In step. 92, the cluster framework 28 sends instructions (via the pathway resource agent instruction signals 42, see FIG. 1) to the pathway resource agents 30 to configure the pathway sets 24 as a data storage resource. In particular, the cluster framework 28 attempts to configure each pathway set 24 in an online operation state so that each pathway set 24 is available for transferring data in accordance with predetermined access conditions.

In step 94, the cluster framework 28 sends instructions to the pathway resource agents 30 directing the agents 30 to monitor and/or reconfigure the pathway sets 24. For example, by monitoring the pathway sets 24, the cluster framework 28 can periodically confirm that the pathway sets 24 are still in their online states, attempt to restore any degraded pathway sets 24, and perform a failover operation in response to a pathway set failure. A pathway set 24 that has suffered degradation to the extent that it is no longer able to transfer data in accordance with the predetermined conditions (e.g., the data storage pathway availability threshold 60, see FIG. 2) will no longer have an online operation state. Rather, such a pathway set 24 will have a non-online operation state (e.g., a faulted operation state).

As an example of how the cluster framework 28 can reconfigure the pathway sets 24, the cluster framework 28 can direct a pathway set 24 to become unavailable, i.e., transition to a non-online state (e.g., an offline state). By way of example, such an operation could be performed in response to the cluster framework's detection of a loss of a service or resource which the pathway set 24 needs (e.g., access to the data storage system 26).

Eventually, in step 96, the cluster framework 28 sends instructions to the pathway resource agents 30 to close or shutdown the pathway sets 24 when the cluster framework 28 is through using the pathway sets 24 as a data storage resource. For example, step 96 can be performed if the system administrator decides to shutdown the computer system 20 for maintenance purposes.

It should be understood that of steps 92 and 94 provide resource availability information that is useful to other parts of the computer system 20. For example, as described above, the operation of other applications 98 may depend on the availability of the pathway sets 24. If particular pathway sets 24 are not available, the applications 98 may choose not to perform certain operations.

Additionally, the availability of multiple pathway sets 24 enables the computer system 20 to perform certain optimizations 100. For example, the computer system 20 can load balance the workload of the applications running on the nodes 22. Accordingly, no node 22 will be significantly overworked relative to the other nodes 22.

Furthermore, the results of step 92 and 94 can be used for cluster resource management 102. For example, the cluster framework 28 or a separate application may provide a graphical user interface 104 to a system administrator to enable the system administrator to track and control services and resources of the cluster. In particular, the system administrator can form service (or resource) groups which are collections of other services (or resources) in a hierarchical dependency arrangement. A loss of one service group 108 (e.g., a service group representing the data storage system 26) may signal a loss of another service group that depends on the lost service group 106 (e.g., the pathway sets 24). Formation and utilization of service groups are described, for example, in the "VERITAS Cluster Server User's Guide," Version 1.0.1, November 1998, the teachings of which are incorporated herein by reference in their entirety.

Figure 4:
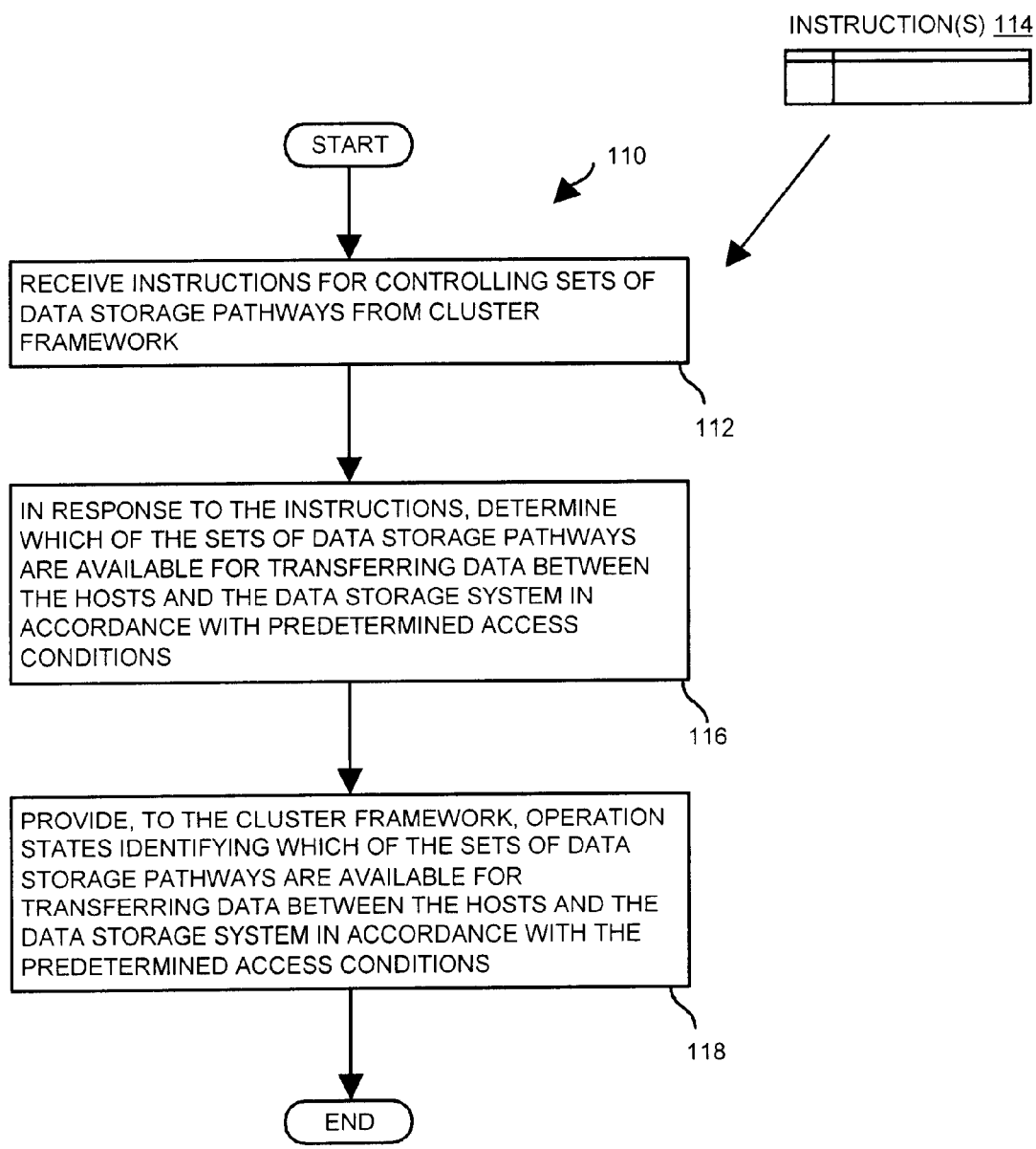
FIG. 4 is a flow chart illustrating the operation of a pathway resource agent of the computer system shown in FIG. 1.

FIG. 4 shows a procedure 110 performed collectively by the pathway resource agents 30 in response to the operations performed by the cluster framework 28 (see procedure 90 in FIG. 3). In particular, in step 112, the pathway resource agents 30 receive instructions 114 from the cluster framework 28 for controlling the pathway sets 24.

In step 116, the pathway resource agents 30 determine which pathway sets 24 are available for transferring data between the nodes 22 and the data storage system 26 in accordance with predetermined access conditions. Some pathway sets 24 may not be available for transferring data between the nodes 22 and the data storage system 26 in accordance with the predetermined access conditions due to pathway failures. For example, one or more pathways 25 of a particular set 24 may be inadvertently cut or damaged preventing data from travelling between a particular node 22 and the data storage system 26 through failed pathways 25 of the particular pathway set 24.

In step 118, the pathways resource agents 30 provide operation states to the cluster framework 28 identifying which of the pathway sets 24 are available for transferring data between the nodes 22 and the data storage system 26 in accordance with the predetermined access conditions. Accordingly, the collective operation of the pathway resource agents 30 enable the cluster framework 28 to provide services to other cluster applications, to provide certain optimizations (e.g., load balancing), and to perform cluster resource management (also see FIG. 3) such as performing a failover operation.

Pathway Resource Agent Details

Figure 5:
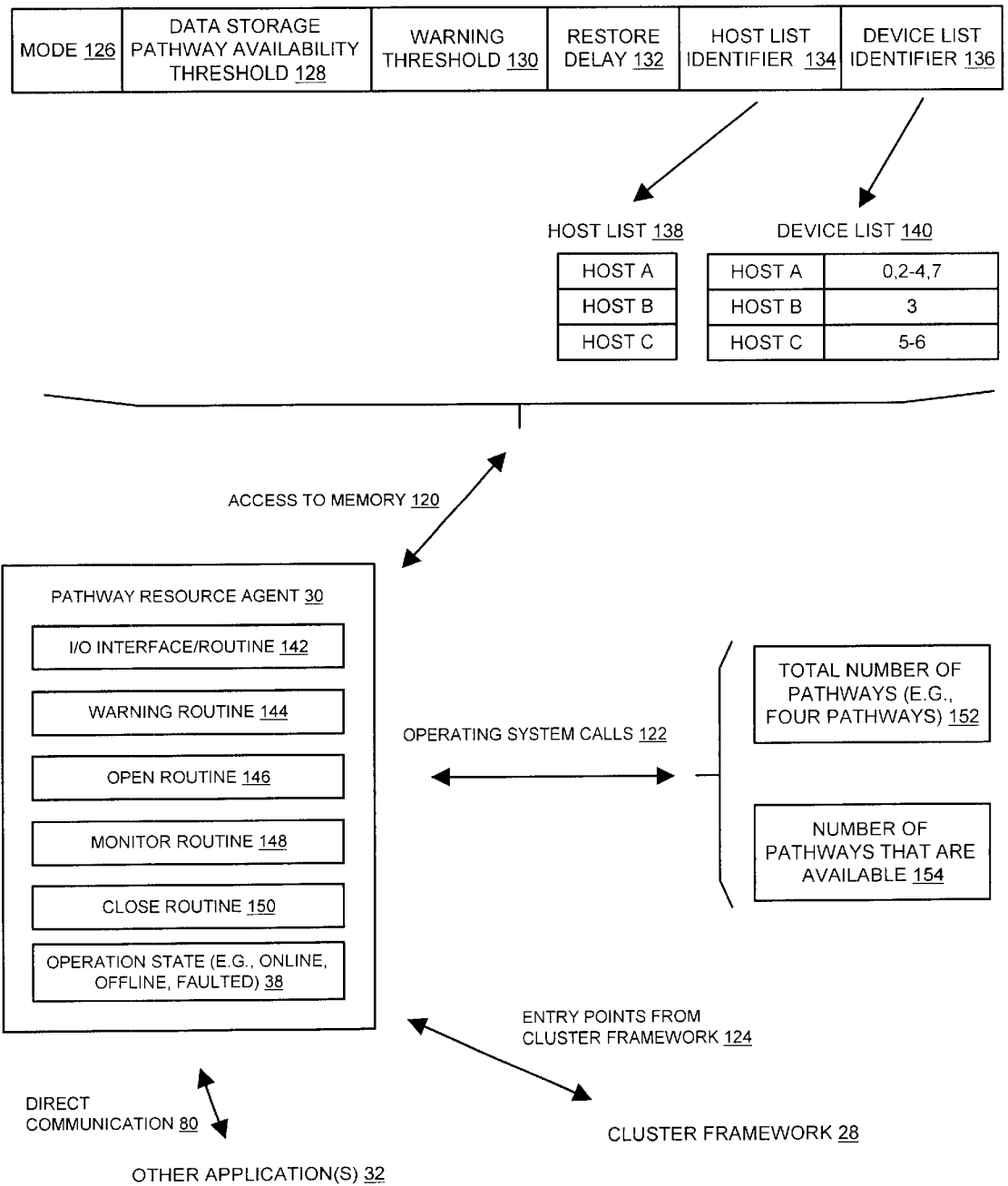
FIG. 5 is a block diagram showing interaction between a pathway resource agent and various host resources of a host of the computer system of FIG. 1.

FIG. 5 provides further details of how a pathway resource agent 30 running on a node 22 interacts with various other parts of the node 22 in accordance with an embodiment of the invention. In particular, the pathway resource agent 30 has memory access 120 to the memory 50, system access 122, cluster framework access 124, and access to other applications 80.

As described earlier, a pathway resource agent 30 operating on a node 22 has access to data structures in that node's memory 50 (see FIG. 2). In one arrangement, a MODE structure 126 indicates an operating mode for the pathway resource agent 30. For example, in one operating mode, the pathway resource agent 30 assumes that each pathway set 24 includes the same number of pathways 25. In another operating mode, the pathway resource agent 30 does not assume that each pathway set 24 includes the same number of pathways 25 and makes a system call to determine the number of pathways 25 extending between the node 22 and the data storage system 26. In yet another operating mode, the pathway resource agent 30 reads data from a user-defined list to determine the number of pathways 25 extending between the node 22 and the data storage system 26.

Further in the memory 50, a data storage pathway availability threshold structure 128 stores the data storage pathway availability threshold 60 shown in FIG. 2. This threshold 60 indicates, as a predetermined access condition associated with that node 22, a minimum percentage or number of pathways that must be available for the pathway resource agent 30 to determine that the pathway set 24 extending from the node 22 to the data storage system 26 is available. For example, the threshold structure 128 may indicate 50%. This means that half or more of the pathways 25 in the pathway set 24 extending from the node 22 to the data storage system 26 must be available for the pathway resource agent 30 to determine that the pathway set 24 is available. Otherwise, the pathway resource agent 30 will consider the pathway set 24 to be unavailable in accordance with the predetermined access conditions.

By way of example only, suppose that each node 22 in the computer system 20 has, as its predetermined access condition, a data storage pathway availability threshold 128 of 50%. As shown in FIG. 1, HOST A has 75% of its pathways available (three of four), HOST B has 100% of its pathways available (three of three), and HOST X has 60% of its pathways available (three of five). Since each node 22 (HOST A, HOST B, and HOST X) has more than 50% (the data storage pathway availability threshold 128) of its pathways available, each pathway set 24-A, 24-B and 24-X is available for transferring data in accordance with the predetermined access conditions.

With reference directed back to FIG. 5, the warning threshold structure 130 (another predetermined access condition) stores the warning threshold 66 shown in FIG. 2. This warning threshold 66 identifies a percentage or number of pathways 25 that must be equaled or exceeded to prevent the pathway resource agent 30 from signaling the cluster framework 28 that the number of available pathways 25 in the pathway set 24 connecting the node 22 to the data storage pathway 26 has dropped to a critical level. By way of example, suppose that the warning threshold 66 for each node 22 in the computer system 20 is 75%. HOST A (75%) and HOST B (100%) would not issue a warning signal because each has 75% or more of its pathways 25 available. However, on HOST X (60%), the pathway resource agent 30-X would issue a warning signal to the cluster framework portion 28-X less than 75% of the pathways 25 in pathway set 25-X are available.

Referring back to FIG. 5, the restore delay structure 132 indicates a time period, which must elapse after the pathway resource agent 30 detects a degraded pathway 25, before the pathway resource agent 30 attempts to restore the degraded pathway 25. This period of time (i.e. a delay) is useful since pathways may occasionally become congested and later clear themselves after such a time period. After the time period has elapsed, the pathway resource agent 30 attempts to restore the degraded pathway 25. Preferably, the pathway resource agent 30 makes a system call to the operating system attempting to clear or reopen the degraded pathway 25. If such an attempt is successful, the number (or percentage) of available pathways 25 in the pathway set 24 will increase.

The host identifier structure 134 and the device list identifier 136 are only used when the mode structure 126 indicates that the pathway resource agent 30 is to read data from a user-defined list to determine the number of pathways 25 extending between the node 22 and the data storage system 26. The host identifier structure 134 stores a pointer to a host list structure 138 which stores a list of nodes 22 in the computer system 20. The device list identifier 136 stores a pointer to a device list structure 140 which stores a list of nodes 22 and their associated data storage devices (e.g., disks) in the data storage system 26.

The pathway resource agent 30 further has access to the operating system of the node 22 through operating system calls 122. Preferably, the pathway resource agent 30 makes one or more system calls to determine the total number of data storage pathways 152 extending from the node 22 to the data storage system 26 and the total number of pathways that are available for transferring data 154 (i.e., non-degraded pathways). On a computer system formed by nodes running the Solaris Operating System manufactured by Sun Microsystems of Palo Alto, Calif. and PowerPath manufactured by EMC Corporation of Hopkinton, Mass., a system call known as "powermt display" provides an output that, when parsed, indicates the number of available pathways 25 and the number of existing pathways. The pathway resource agent 30 stores the total number of pathways 152 and the number of available pathways 154 in the data structures 38 and 40, respectively (also see FIG. 1).

The pathway resource agent 30 can access the cluster framework 28 through cluster framework entry points 124. Preferably, the pathway resource agent 30 accesses the cluster framework 28 by calling one or more library routines of the cluster framework 28.

Furthermore, the pathway resource agent 30 can have direct communication 80 with the other applications 32 running on the node 22. For example, the pathway resource agent 30 may be able to call a particular utility application in response to a particular event.

As mentioned earlier, the pathway resource agent 30 includes a set of routines 34 (see FIG. 1). In particular, as shown in FIG. 5, the pathway resource agent 30 includes an I/O routine 142, a warning routine 144, an open routine 146, a monitor routine 148, and a close routine 150. The pathway resource agent 30 performs the I/O routine 142 when sending or receiving a signal with another part of the cluster (e.g., the cluster framework 28, another application 32, etc.).

In general, the pathway resource agent 30 performs the warning routine 144 when it checks to determine whether the number of pathways that are available has dropped to a critical level. If the number of pathways has dropped to a critical level, the pathway resource agent 30 issues a warning signal to the cluster framework 28 to advise the cluster framework 28 of the situation.

The pathway resource agent 30 performs the open routine 146 in response to one or more instructions from the cluster framework 28 (e.g., as part of step 92, see FIG. 3). When the pathway resource agent 30 performs the open routine 146, the pathway resource agent 30 attempts to make the pathway set 24 available to the computer system as a data storage resource. If the agent 30 is successful in making the pathway set 24 available, the agent 30 provides an online operation state to the cluster framework 28. If the agent 30 is unsuccessful, the agent 30 provides a non-online operation state (e.g., a faulted state) to the cluster framework 28.

The pathway resource agent 30 performs the monitor routine 148 when the cluster framework 28 directs the agent 30 (through one or more instructions sent by the cluster framework as part of step 94, see FIG. 3) to monitor the pathway set 24 connecting the node 22 to the data storage system 26. Preferably, the monitor routine 148 calls the warning routine 144 to check whether a warning signal is warranted. In one arrangement, the cluster framework 28 directs the agent 30 to periodically monitor the pathway set 24 (e.g., through periodic instructions).

The pathway resource agent 30 performs the close routine 150 in response to one or more instructions from the cluster framework 28 (e.g., as part of step 96, see FIG. 3). When the pathway resource agent 30 performs the close routine 150, the agent 30 attempts to bring the pathway set 24 into a non-online state (e.g., an offline state). Once in the offline state, the pathway set 24 is no longer available as a data storage resource to the cluster framework 28.

Figure 6:
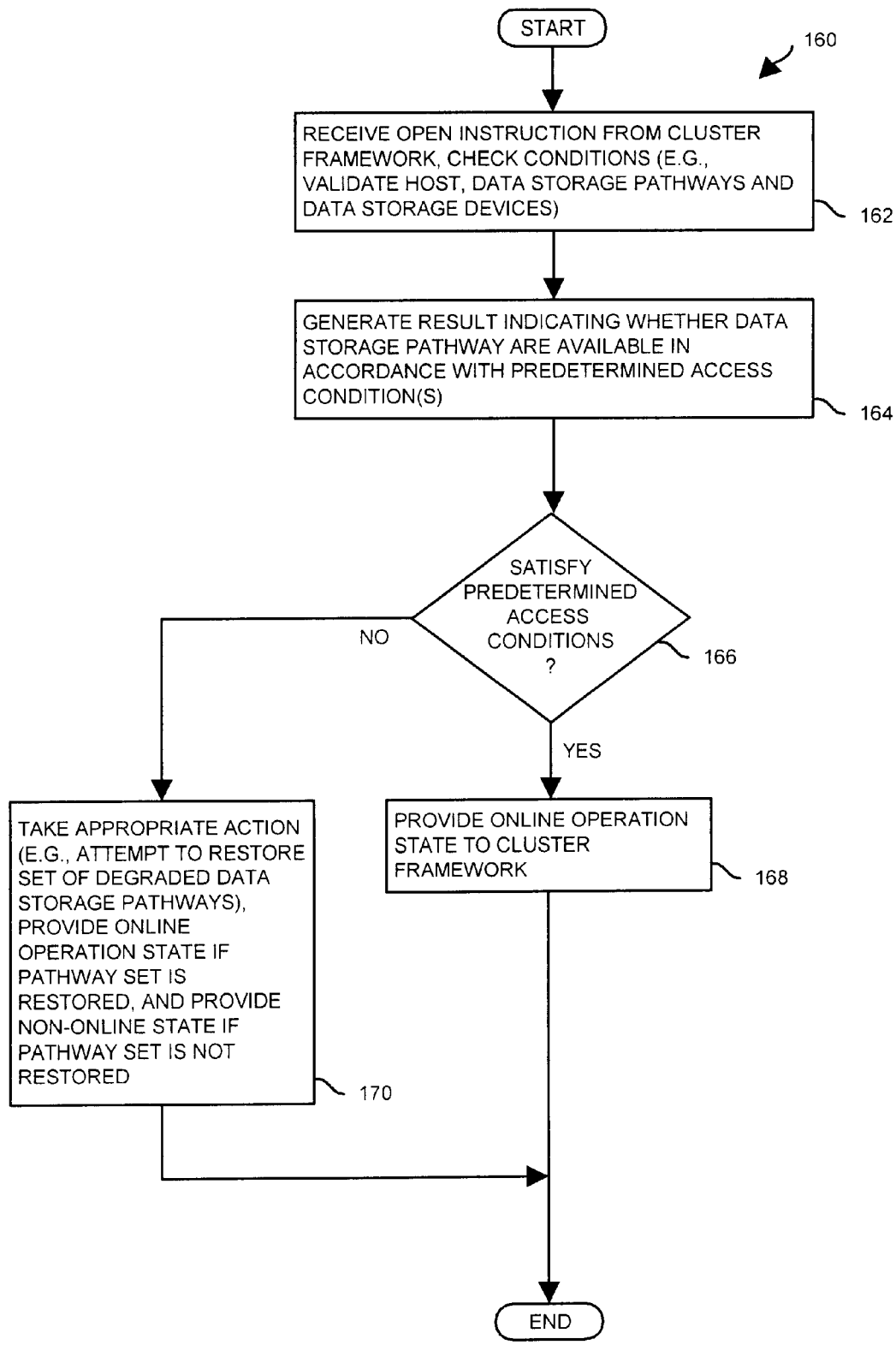
FIG. 6 is a flow chart illustrating the operation of the pathway resource agent of FIG. 5 when making a set of data storage pathways available to the cluster framework shown in FIGS. 1–3.

Further details of some of the various routines of the pathway resource agent 30 will now be provided. The pathway resource agent 30 performs a procedure 160, as shown in FIG. 6, as part of the open routine 146. In step 162, the pathway resource agent 30 receives an open instruction from the cluster framework 28 and checks various cluster environment conditions. In particular, the agent 30 verifies (or validates) that it is configured properly, e.g., that the agent 30 is operating on the correct node 22, and that there are data storage pathways 25 connecting that node 22 to the data storage system 26.

In step 164, the pathway resource agent 30 generates a result for determining whether the set of data storage pathways 24 is available for transferring data in accordance with predetermined access conditions. In one arrangement, the pathway resource agent 30 running on a node 22 obtains the number of available pathways 25. In another arrangement, the pathway resource agent 30 running on a node 22 obtains the number of available pathways 25 and the number of existing pathways 25 connecting the node 22 to the data storage system, and divides the number of available pathways 25 by the number of existing pathways to determined the percentage of available pathways 25. The equation is as follows:

$$\text{Percentage of available pathways} = \frac{\text{Number of pathways 25 available for transferring data from the node 22 to the data storage system 26}}{\text{Number of pathways 25 in the pathway set 24 connecting the node 22 to the data storage system 26}}.$$

In step 166, the pathway resource agent 30 decides whether the data storage pathway set 24 is available or not available. In the arrangement where the predetermined access conditions include a minimum number as the data storage pathway availability threshold 128, the agent 30 running on a node 22 compares the number of available pathways with the data storage pathway availability threshold 128 (i.e., a minimum number) of that node. In the arrangement where the predetermined access conditions includes a minimum percentage as the data storage pathway availability threshold 128, the agent 30 running on a node 22 compares the percentage of available pathways with the data storage pathway availability threshold 128 (i.e., a minimum percentage) of that node. If the generated results indicate that the pathway set 24 is available (e.g., if the percentage of available pathways is greater than or equal to the minimum number or percentage threshold), step 166 proceeds to step 168. Otherwise, step 166 proceeds to step 170.

In step 168, the pathway resource agent 30 provides an online operation state to the cluster framework 28 indicating that the pathway set 24 is available for transferring data in accordance with the predetermined access conditions.

In step 170, the pathway resource agent 30 takes appropriate action. In one arrangement, the agent simply provides a non-online operation state to the cluster framework 28 indicating that the pathway set 24 is unavailable for transferring data in accordance with the predetermined access conditions. In another arrangement, the agent 30 attempts to restore the pathway set 24. If the attempt is successful, the agent 30 provides an online operation state to the cluster framework 28 indicating that the pathway set 24 is available for transferring data in accordance with the predetermined access conditions. If not, the agent 30 provides a non-online operation state (e.g., a faulted state) to the cluster framework 28 indicating that the pathway set 24 is unavailable for transferring data in accordance with the predetermined access conditions.

Figure 7:
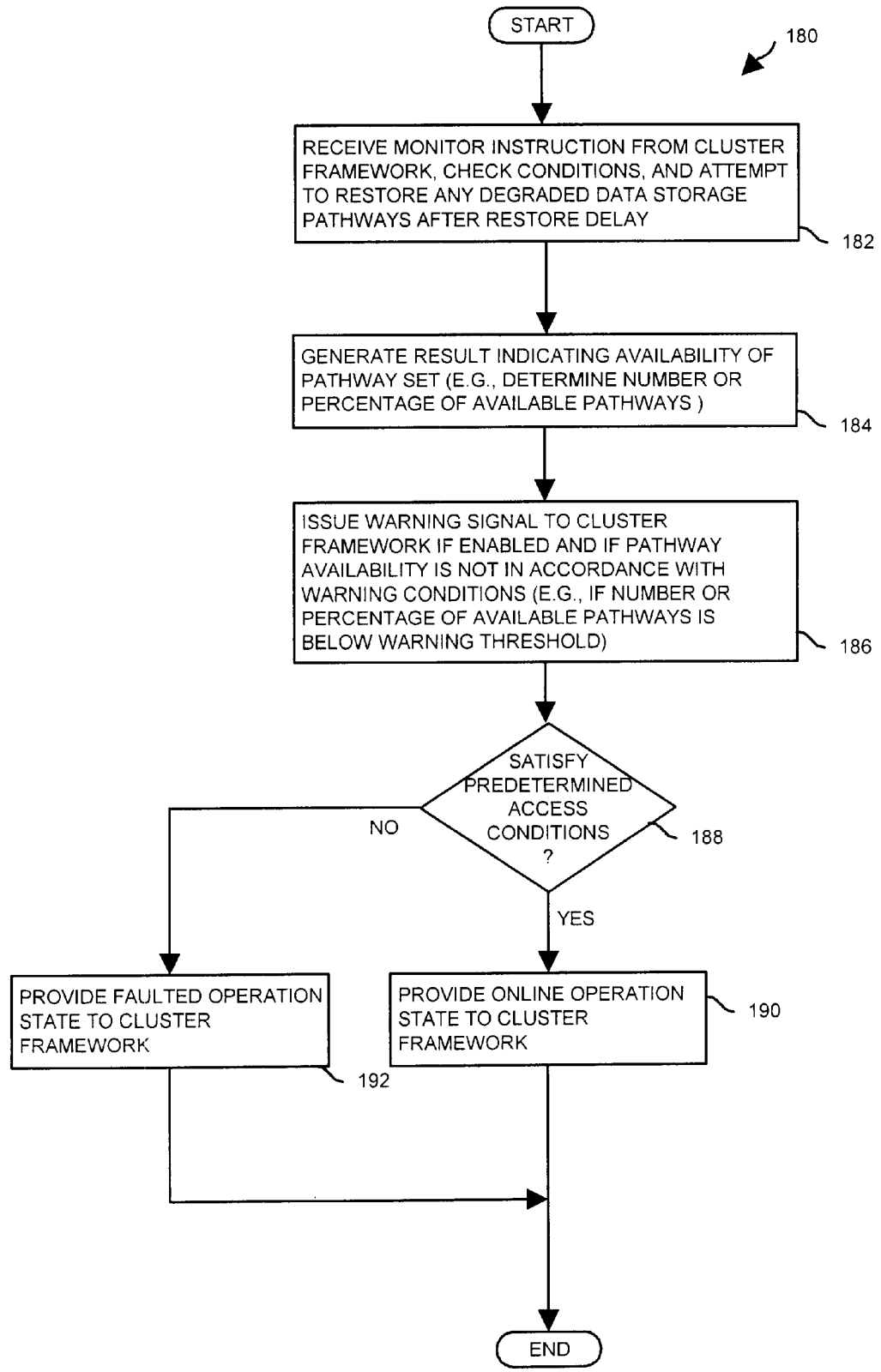
FIG. 7 is a flow chart illustrating the operation of the pathway resource agent of FIG. 5 when monitoring a set of data storage pathways for the cluster framework shown in FIGS. 1–3.

Further details of the monitor routine 148 of FIG. 5 will now be discussed. For the monitor routine 148, the pathway resource agent 30 performs a procedure 180 as shown in FIG. 7. In step 182, the pathway resource agent 30 receives a monitor instruction from the cluster framework 28, checks various cluster environment conditions, and attempts to restore any degraded pathways 25. In particular, the agent 30 verifies that it is configured properly in a manner similar to that for step 162 of the procedure 160 of the open routine (see FIG. 6) and, if there are any degraded pathways 25, waits the restore delay 132 (see FIG. 5) and attempts to restore the degraded pathways 25.

In step 184, the pathway resource agent 30 generates a result indicating the availability of the pathway set 24, e.g., the percentage of available pathways 25 in the pathway set 24. This operation is similar to that of step 164 in procedure 160 of the open routine 146.

In step 186, if the pathway resource agent 30 is configured to provide a warning signal, the pathway resource agent 30 issues a warning signal to the cluster framework 28 when the result generated in step 184 is a percentage or number of available pathways that is less than the warning threshold 130. That is, the agent 30 compares the result of step 184 to the warning threshold 130. If the result is greater than or equal to the warning threshold, the agent 30 does not provide the warning signal. However, if the result is less than the warning threshold 130, the agent 30 provides the warning signal to the cluster framework 28.

In step 188, the pathway resource agent 30 decides whether the data storage pathway set 24 is available or not available in accordance with the predetermined access conditions. In particular, the agent 30 compares the result of step 184 to the data storage pathway availability threshold 128. If the percentage or number of available pathways is greater than or equal to the data storage pathway availability threshold (i.e., if the generated results indicate that the pathway set 24 is available), step 188 proceeds to step 190. Otherwise, step 188 proceeds to step 192.

In step 190, the pathway resource agent 30 provides an online operation state to the cluster framework 28 indicating that the pathway set 24 is available for transferring data in accordance with the predetermined access conditions.

In step 192, the pathway resource agent 30 takes appropriate action. In one arrangement, the agent 30 simply provides a non-online operation state to the cluster framework 28 indicating that the pathway set 24 is unavailable for transferring data in accordance with the predetermined access conditions. In an alternative arrangement, the agent 30 attempts to restore the pathway set 24. If the attempt is successful, the agent 30 provides an online operation state to the cluster framework 28 indicating that the pathway set 24 is available for transferring data in accordance with the predetermined access conditions. If not, the agent 30 provides a non-online operation state (e.g., a faulted state) to the cluster framework 28 indicating that the pathway set 24 is unavailable for transferring data in accordance with the predetermined access conditions.

Figure 8:
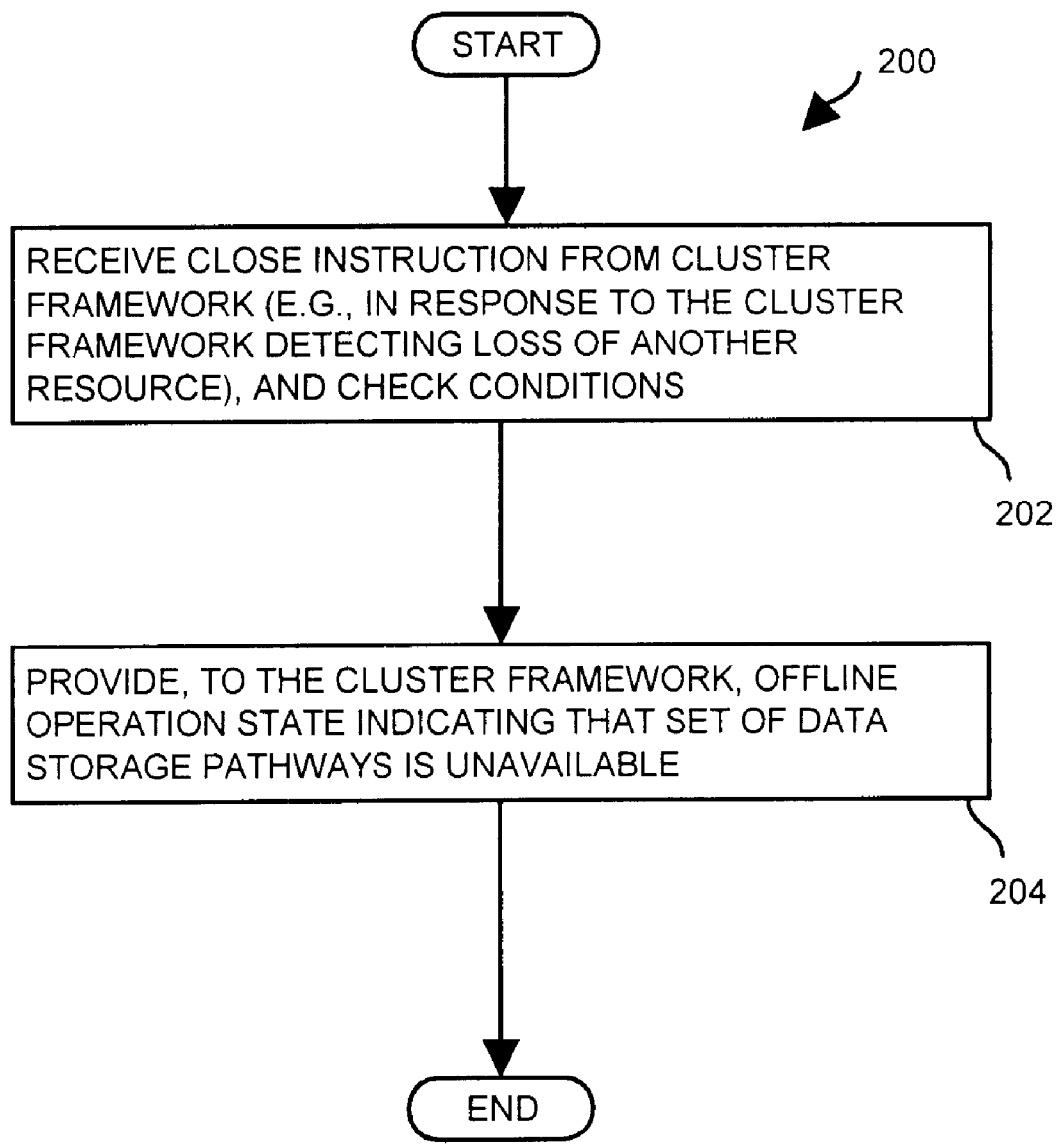
FIG. 8 is a flow chart illustrating the operation of the pathway resource agent of FIG. 5 when closing a set of data storage pathways such that the pathway set is unavailable to the cluster framework shown in FIGS. 1–3.

Further details of the close routine 150 of FIG. 5 will now be explained. For the close routine 150, the pathway resource agent 30 performs a procedure 200 as shown in FIG. 8. In step 202, the pathway resource agent 30 receives a close instruction from the cluster framework 28, and verifies operating conditions in a manner similar to step 162 of the open routine (see FIG. 6). By way of example, the close instruction may be provided by the cluster framework in response to the loss of another resource (or service) from which the pathway set 24 depends (e.g., a failure of the data storage system 26).

In step 204, the pathway resource agent 30 provides an offline operation state to the cluster framework 28 indicating that the pathway set 24 is unavailable for transferring data.

The receipt of the offline operation state may then cause the cluster framework 28 to perform one or more other operations such as an application failover procedure or a signaling of another resource or service that depends on the pathway set 24 to close or go offline.

EXAMPLES

An example of a failover operation for a computer system that uses pathway resource agents in accordance with the invention will now be provided. Suppose that the computer system 20 initially has failures as shown in FIG. 1. That is, at startup, one of the four data storage pathways 25 in pathway set 24-A has a failure, and two of the five data storage pathways 25 in pathway set 24-X have failures. Also, suppose that the predetermined access conditions include a warning threshold of 75% and a minimum percentage threshold of 50% for each of the nodes 22. Furthermore suppose that the system administrator has configured the cluster framework 28 to perform an application failover operation in the event that one of the nodes 22 cannot exchange data with the data storage system 26 within the predetermined access conditions (i.e., within the minimum percentage threshold 50%), as indicated by communicating with the pathway resource agents 30.

At start up, the cluster framework 28 sends instructions (see signals 42 in FIG. 1) to the pathway resource agents 30 directing them to attempt to configure the pathway sets 24 as data storage resources for the computer system 20. In response, the pathway resource agent 30 running on each node 22 determines that the pathway set 24 connecting that node 22 to the data storage system 26 is not at a critical level of pathway availability and can transfer data within the predetermined access conditions. That is, HOST A determines that 75% of its pathways 25 are available which is greater than or equal to the warning threshold of 75% and greater than or equal to the minimum percentage threshold of 50%. Similarly, HOST B determines that 100% of its pathways are available which is greater than or equal to the warning threshold of 75% and greater than or equal to the minimum percentage threshold of 50%, and so on. Accordingly, each of the pathway resource agents 22 provides its respective cluster framework portion 28 with an online operation state indicating that its associated pathway set 24 is available. After the pathway sets 24 are configured as data storage resources for the computer system 20, the cluster framework 28 starts applications 32 running and periodically communicates with the pathway resource agents 30 to monitor the pathway sets 24.

Suppose that an additional failure subsequently occurs in one of the pathways 25 in the pathway set 24-A connecting HOST A to the data storage system 26. The cluster framework 28, which periodically monitors the states of the pathway sets 24 sends a monitor instruction to the pathway resource agent 30 to verify that the pathway set 24-A has not degraded. Due to the loss of an additional pathway 25, the pathway resource agent 30 determines that there are 50% of the pathways 25 in the pathway set 24-A available. Since the pathway availability has dropped below the warning threshold of 75%, the pathway resource agent 30-A sends a warning signal (e.g., signal 44 in FIG. 1) to the cluster framework 28. The warning signal may trigger a warning message to be displayed for the system administrator on a graphical user interface indicating that the pathway availability for pathway set 24-A has fallen to a critical level. Since the pathway availability (50%) still is greater than or equal to the minimum percentage threshold of 50%, the pathway resource agent 30 further returns an online operation state (signal 44) to the cluster framework 28 indicating that the pathway set 24-A is still available as a data storage resource to the computer system 20.

Suppose that the system administrator does not attend to removing the failures in the pathway set 24-A and that yet another pathway 25 fails in pathway set 24-A. At this time the percentage of pathways that are available in the pathway set 24-A is 25% (one out of four). In response to the next monitor instruction sent by the cluster framework portion 28-A to the pathway resource agent 30-A, the pathway resource agent 30-A will return a faulted operation state to the cluster framework 28-A indicating that the pathway set 24-A is no longer available as a data storage resource to the computer system 20.

In response to the faulted state provided by the pathway resource agent 30-A to the cluster framework portion 28-A, the cluster framework 28 performs a failover operation that migrates the applications 32-A depending on the availability of the pathway set 24-A in accordance with the predetermined access conditions to one or more other nodes 22. For example, the cluster framework 28 verifies that the pathway set 24-X for HOST X is available as a data storage resource (i.e., has an online operation state), cleanly shuts down the applications 32-A on HOST A, and restarts them on HOST X.

The cluster framework 28 then monitors the pathway set 24-X on HOST X, and if a failure of the pathway set 24-X occurs, the cluster-framework 28 will attempt to perform a failover operation to another node 22. Accordingly, the computer system 20 has been able to provide fault-tolerant failover protection for an application (e.g., applications 32-A) in response to a failure (e.g., the loss of multiple sets of data storage pathways 25) even though not the failure was not complete (at least one data storage pathway 25 remaining intact. As a result, migration of the application occurs in a manner that maintain application execution that is free of such failures (i.e., free of running at a reduced rate due to the failures) on one or more other nodes running at a preferably higher rate (e.g., HOST X).

Another example of a failover operation for a computer system that uses pathway resource agents in accordance with the invention will now be provided. The example shows how the pathway resource agents communicate with a cluster framework when a failure occurs in a resource from which the pathway resource agents depend.

Figure 9:
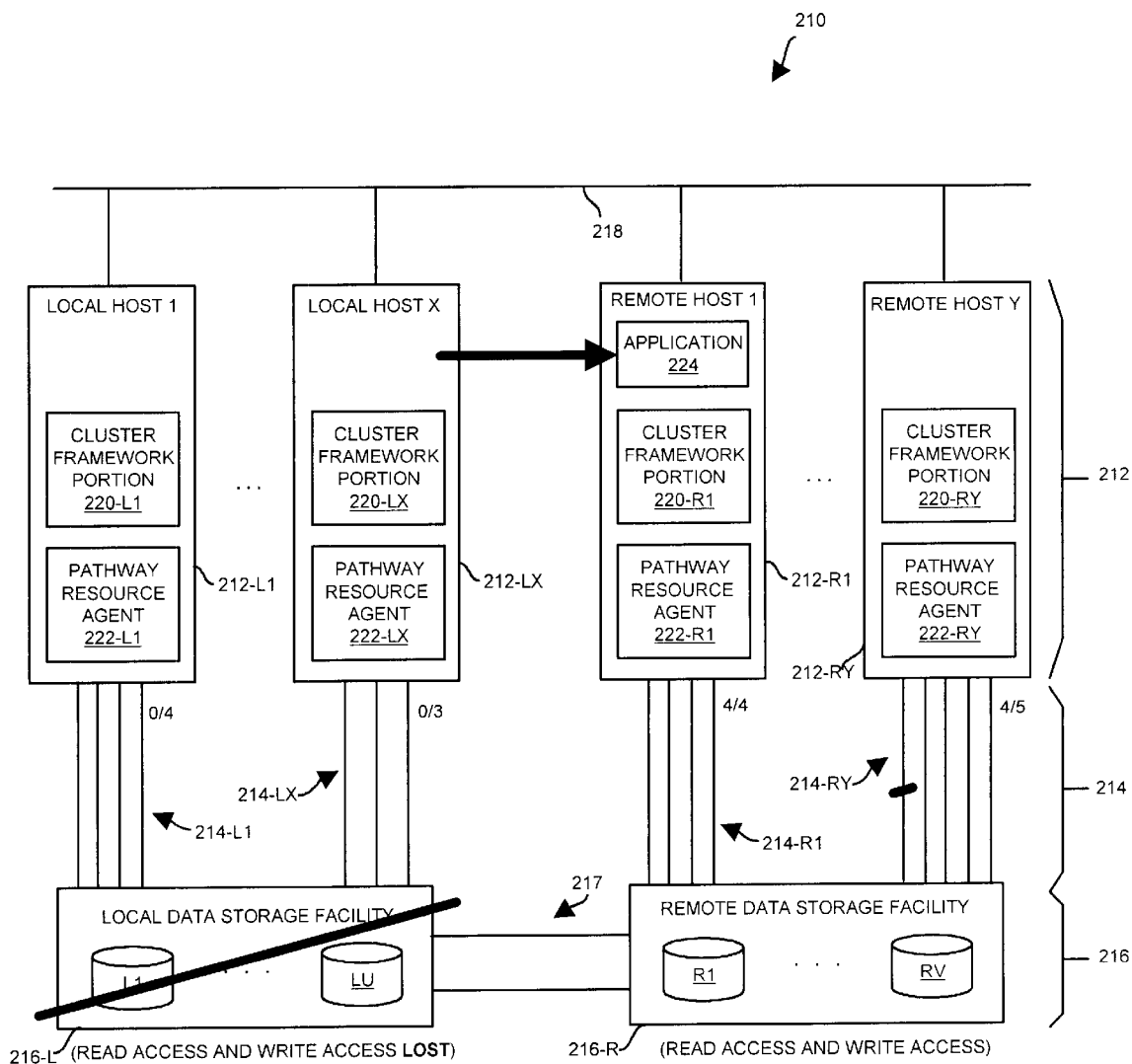
FIG. 9 is a block diagram of the computer system of FIG. 1 when the computer system is in a distributed arrangement and when the data storage system incurs a fault causing a failover situation to occur.

As shown in FIG. 9, a computer system 210 includes nodes 212 (e.g., LOCAL HOST 1, . . . LOCAL HOST X, REMOTE HOST 1, . . . , REMOTE HOST Y), sets of data storage pathways 214, and a data storage system 216. The computer system 210 is similar to the computer system 20 (see FIG. 1) except that the nodes 212 are distributed between a local set (i.e., LOCAL HOST 1, . . . LOCAL HOST X) and a remote set (i.e., REMOTE HOST 1, . . . , REMOTE HOST Y), and that the data storage system 26 includes local and remote data storage facilities that respectively connect to the local and remote node sets.

In particular, the data storage system 216 includes a local data storage facility 216-L (having disks L1, . . . , LU) and a remote data storage facility 216-R (having disks R1, . . . , RV). The remote data storage facility 216-R stores a copy of the contents of the local data storage facility 216-L. In particular, data written to the local data storage facility 216-L is copied to the remote data storage facility 216-R through one or more dedicated links 217. Preferably, the data storage facilities 216 are fault-tolerant arrays of disks such as two Symmetrix Systems remotely connected using a Symmetrix Remote Data Facility (SRDF), all of which are manufactured by EMC Corporation of Hopkinton, Mass.

The pathway sets 214 include a pathway set 214-L1 of four pathways connecting LOCAL HOST 1 to the local data storage facility 216-L, a pathway set 214-LX of three pathways connecting LOCAL HOST X to the local data storage facility 216-L, a pathway set 214-R1 of four pathways connecting REMOTE HOST 1 to the remote data storage facility 216-R, a pathway set 214-RX of five pathways connecting REMOTE HOST Y to the remote data storage facility 216-R.

Each node 212 of the cluster 210 runs a respective cluster framework portion 220 and a pathway resource agent 222. The cluster framework portions 220 communicate with each other through a connection medium 218 (e.g., a network link), and collectively operate as a cluster framework 220.

A system administrator has configured the cluster framework 220 such that the cluster framework 220 understands that the pathway sets 214-L1 through 214-LX, as a data storage resource for the computer system 210, depend on the availability of the data storage facility 216-L, and that the pathway sets 214-R1 through 214-RY, as a data storage resource for the computer system 210, depend on the availability of the data storage facility 216-R. Furthermore, the system administrator has configured the cluster framework 220 to understand that the application 224, which initially operates on LOCAL HOST X, depends on the pathway set 214-LX.

Suppose that initially there are no failures in the computer system 210. At startup, the cluster framework 220 configures the pathway sets 214 by sending open instructions to the agents 222. In response, the agents 222 perform open routines to open the pathway sets 214. Since initially there are no failures, the agents 222 provide online operation states to the cluster framework 220 indicating that the pathway sets 214 are available for transferring data in accordance with predetermined access conditions. Since pathway set 214-LX is available, the cluster framework 220 signals the application 224 on LOCAL HOST X to begin operation. Accordingly, the application 224 begins operation.

Over time, parts of the computer system 210 may fail. For example, as shown in FIG. 9, a pathway of the pathway set 214-RY fails. The cluster framework 220 periodically instructs the pathway resource agents 222 to monitor the availability of the pathway sets 214 and the data storage facilities 216. In particular, the cluster framework 220 periodically sends monitor instructions to the pathway resource agents 222, that subsequently verify that the pathway sets remain available, and if one or more failures are detected, manages services (or resources) in the cluster to prevent such failures from affecting computer system performance.

Suppose that the local data storage facility 216-L of the data storage system 216 fails. In particular, suppose that the local hosts (i.e., LOCAL HOST 1, ... LOCAL HOST X) are no longer able to read from and write to the local data storage facility 216-L. If the local hosts are still capable of operating, the cluster framework portions 220 on those hosts receive faulted operation states from the pathway resource agents 222 on the local hosts in response to monitor instructions. In response to the faulted states, the cluster framework 220 instructs the pathway resource agents 222 on those nodes to close their respective pathway sets 214. If the local hosts are not capable of operating, the local hosts simply remain idle (in hung states) until the system administrator can attend to them.

Additionally, the cluster framework portion 220-R1 instructs the pathway resource agent 222-R1 to configure the remote data storage resource facility 216-R for read and write access, and instructs the pathway set 214-R1 connecting REMOTE HOST 1 to the data storage system 216 to become available as a data storage resource that provides access to the data storage facility 216-R. In response to the cluster framework instruction, the pathway resource agent 222 configures the pathway set 214-R1 to provide such access (see procedure 160 in FIG. 6). If the cluster framework portion 220-R1 receives an online operation state from the pathway resource agent 222-R1, the cluster framework portion 220-R1 restarts and runs the application 224. If the cluster framework portion 220-R1 receives a non-online operation state from the pathway resource agent 222-R1, the cluster framework portion 220-R1 signals another node 212 (e.g., the cluster framework portion 220-RY on REMOTE HOST Y) to perform a failover operation for the application 224. Accordingly, the cluster 210 provides fault-tolerant operation to maintain execution of the application 224.

Alternative Configuration

Figure 10:
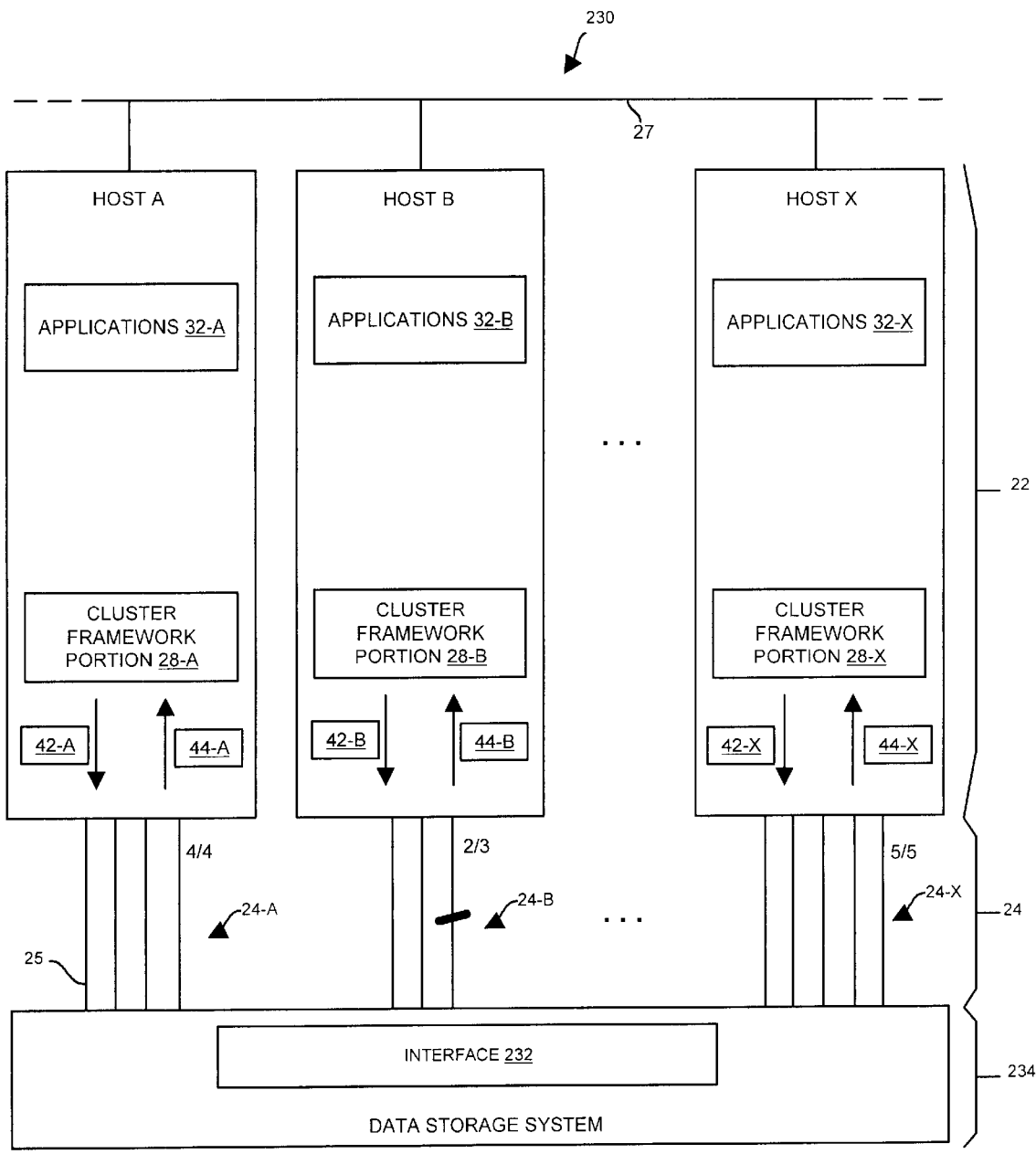
FIG. 10 is a block diagram showing an alternative arrangement for the computer system of FIG. 1.

FIG. 10 shows a computer system 230 configured in accordance with an embodiment of the invention. In contrast to the embodiment illustrated in FIG. 1, nodes 22 do not run pathway resource agents. Rather, the computer system 230 includes a data storage system 234 having an interface 232 that provides information exchange with the cluster framework 28 in a manner that is similar to the pathway resource agents 30 of the computer system 20 in FIG. 1. Instructions and data are exchanged between the cluster framework 28 and the interface 232 through the sets of pathways 24 (or alternatively through another communications medium, not shown).

A benefit of the computer system 230 over the computer system 20 is that the computer system 230 removes the burden of handling pathway resource agents from the nodes 22. Rather, the burden is placed on the data storage system 234 thus freeing the nodes 22 to perform other tasks or the same tasks at a faster rate.

A benefit of the computer system 20 over the computer system 230 is that the computer system 20 does need to send instructions and data (signals 42, 44) through the pathway sets 24 or other pathways. Rather, the pathway sets 24 are not burdened by an increase in traffic, or alternatively, other pathways are not required.

In any of the arrangements described above (e.g., see FIGS. 1, 9 and 10), the computer systems provide fault tolerance and enhanced failover capability. A cluster framework can perform a failover operation for an application from a first node to a second node even if the pathway set connecting the first node to a data storage system has not completely failed. Rather, if the pathway set has failed to a significant extend that could affect the operating rate of the first node, the application can failover to the second node to provide services free of any pathway degradation. The invention, as described above, may be particularly useful in fault-tolerant cluster settings such as those manufactured by EMC Corporation of Hopkinton, Mass.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, the cluster nodes were described as being general purpose computers (see FIG. 2). The nodes can be any computing device capable of being clustered, and capable of being configured to run programs (e.g., a cluster framework, applications, etc.) in a fault-tolerant manner. Accordingly, the computer system described above (e.g., computer systems 20, 210 and 230) can include, as nodes, mainframes, workstations, personal computers, specialized processing devices, multi-processing computers, distributed computers, etc., and combinations thereof.

Additionally, it should be understood that the predetermined access conditions are preferably provided by the cluster framework. A system administrator can set the predetermined access conditions using a graphical user interface of the cluster framework. The predetermined access conditions are then distributed to the pathway resource agents (e.g., see agents 30 in FIG. 1) or data storage system interface (e.g., see interface 232 in FIG. 10).

Alternatively, the predetermined access conditions are directly inputted into the pathway resource agents or data storage system interface by the system administrator. As another alternative, a utility that is separate from the cluster framework provides the predetermined access conditions.

Moreover, the predetermined access conditions do not need to include just a percentage or number of available pathways for each node. Rather, they may include other criteria such as a number of pathways that must fail, or include combinations of any of the percentages or numbers thereof. Also, the predetermined access conditions can be different on each node to improve customized operation of the computer system (e.g., some nodes may have faster hardware than others which can be factored into the predetermined access conditions to prevent a failover operation from a reduced rate node that is still faster than an un-hindered node).

Furthermore, it should be understood that the cluster framework can be provided as part of the cluster operating system itself. Alternatively, the cluster framework is a separate layer running on top of the cluster operating system.

Additionally, it should be understood that the fault tolerance provided by the invention is against either hardware faults or software faults. The loss of hardware (e.g., a cut data storage pathway 25, see FIG. 1) or a software failure (e.g., a software failure in the data storage system 26 triggering the cluster framework 28 to direct a pathway set 24 offline, see FIG. 1) is suitable to cause an application failover operation in accordance with the invention.

Furthermore, it should be understood that the invention can be applied to other fault-tolerant resources (or services) other than sets of data storage pathways. For example, the invention can be applied to other resources where it would be useful to deem a resource as unavailable, as a whole, (e.g., a set of data storage pathways) after the resource degrades and even if part of the resource (individual pathways) remains intact. By considering the resource unavailable, the user of the resource (e.g., an application or cluster framework) can perform a fault-tolerant operation to improve performance (e.g., an application failover operation) rather than continue operating under a degraded resource condition.

What is claimed is:

1. A method for providing access to data storage pathways that connect a cluster of nodes to a data storage system, the method comprising the steps of:

receiving, from a cluster framework operating on the cluster of nodes, instructions for controlling multiple sets of the-data storage pathways that connect the cluster of nodes to the data storage system;

determining, in response to the instructions, which of the multiple sets of data storage pathways are available for transferring data between the cluster of nodes and the data storage system in accordance with predetermined access conditions; and providing, to the cluster framework, operation states identifying which of the multiple sets of data storage pathways are available for transferring data between the cluster of nodes and the data storage system in accordance with the predetermined access conditions, the cluster of nodes accessing the data storage pathways based on the operation states, wherein each node connects to the data storage system through one of the multiple sets of data storage pathways, and wherein the step of providing includes the step of:

supplying, for each node, an operation state indicating whether a set of data storage pathways connecting that node to the data storage system is available for transferring data between that node and the data storage system in accordance with the predetermined access conditions.

2. The method of claim 1 wherein the predetermined access conditions include, for a particular set of data storage pathways, a minimum percentage of the particular set of data storage pathways that must be available for transferring data between a particular node and the data storage system in order for a determination to be made that the particular set is available for transferring data, and wherein the method further comprises the step of:

providing, as an operation state corresponding to the particular set of data storage pathways, a faulted state when the percentage of the particular set of data storage pathways available for transferring data between the particular node and the data storage system decreases from a value that is greater than or equal to the minimum percentage to a value that is below the minimum percentage, the faulted state indicating to the cluster framework that the particular set of data storage pathways is no longer available for transferring data between the particular node and the data storage system in accordance with the predetermined access conditions.

3. The method of claim 1, further comprising the steps of:

in response to a resource of the data storage system becoming unavailable, receiving a particular instruction from the cluster framework to make a particular set of data storage pathways unavailable for transferring data between a particular node and the data storage system; and in response to the particular instruction, providing, as an operation state corresponding to the particular set of data storage pathways, an offline state to the cluster framework, the offline state indicating to the cluster framework that the particular set of data storage pathways is no longer available for transferring data between the particular node and the data storage system in accordance with the predetermined access conditions.

4. The method of claim 1 wherein the predetermined access conditions include, for a particular set of data storage pathways that connect a particular node to the data storage system, a minimum number of the particular set of data storage pathways that must be available for transferring data between the particular node and the data storage system in order for a determination to be made that the particular set is available for transferring data.

5. The method of claim 4 wherein the step of determining includes the step of:

determining that the particular set of data storage pathways is unavailable for transferring data when (i) less than the minimum number of the particular set of data storage pathways is available to transfer data between the particular node and the data storage system, and (ii) at least one data storage pathway of the particular set of data storage pathways is available to transfer data between the particular node and the data storage system.

6. The method of claim 1 wherein the predetermined access conditions include, for a particular set of data storage pathways, a minimum number of the particular set of data storage pathways that must be available for transferring data between a particular node and the data storage system in order for a determination to be made that the particular set is available for transferring data, and wherein the method further comprises the step of:

providing, as an operation state corresponding to the particular set of data storage pathways, a faulted state when the number of the particular set of data storage pathways available for transferring data between the particular node and the data storage system decreases from a value that is greater than or equal to the minimum number to a value that is below the minimum number, the faulted state indicating to the cluster framework that the particular set of data storage pathways is no longer available for transferring data between the particular node and the data storage system in accordance with the predetermined access conditions.

7. The method of claim 1 wherein each set of data storage pathways of the multiple sets of data storage pathways includes at least two data storage pathways.

8. The method of claim 7 wherein each data storage pathway is a point-to-point connection which is configured to carry data between the cluster of nodes and the data storage system, and wherein the data storage system is external to the cluster of nodes.

9. The method of claim 1 wherein the step of determining includes the step of:

for a set of data storage pathways, comparing a percentage of non-faulted data storage pathways within that set of data storage pathways to a predetermined non-faulted data storage pathway threshold percentage to determine whether that set of data storage pathways is available to carry data.

10. A method for providing access to data storage pathways that connect a cluster of nodes to a data storage system, the method comprising the steps of:

receiving, from a cluster framework operating on the cluster of nodes, instructions for controlling multiple sets of the data storage pathways that connect the cluster of nodes to the data storage system;

determining, in response to the instructions, which of the multiple sets of data storage pathways are available for transferring data between the cluster of nodes and the data storage system in accordance with predetermined access conditions; and providing, to the cluster framework, operation states identifying which of the multiple sets of data storage pathways are available for transferring data between the cluster of nodes and the data storage system in accordance with the predetermined access conditions, the cluster of nodes accessing the data storage pathways based on the operation states, wherein the predetermined access conditions include, for a particular set of data storage pathways that connect a particular node to the data storage system, a minimum percentage of the particular set of data storage pathways that must be available for transferring data between the particular node and the data storage system in order for a determination to be made that the particular set is available for transferring data.

11. The method of claim 10 wherein the step of determining includes the step of:

determining that the particular set of data storage pathways is unavailable for transferring data when (i) less than the minimum percentage of the particular set of data storage pathways is available to transfer data between the particular node and the data storage system, and (ii) at least one data storage pathway of the particular set of data storage pathways is available to transfer data between the particular node and the data storage system.

12. A method for providing access to data storage pathways that connect a cluster of nodes to a data storage system, the method comprising the steps of:

receiving, from a cluster framework operating on the cluster of nodes, instructions for controlling multiple sets of the data storage pathways that connect the cluster of nodes to the data storage system;

determining, in response to the instructions, which of the multiple sets of data storage pathways are available for transferring data between the cluster of nodes and the data storage system in accordance with predetermined access conditions;

providing, to the cluster framework, operation states identifying which of the multiple sets of data storage pathways are available for transferring data between the cluster of nodes and the data storage system in accordance with the predetermined access conditions, the cluster of nodes accessing the data storage pathways based on the operation states; and issuing a warning signal to the cluster framework when a percentage of a particular set of data storage pathways available for transferring data between a particular node and the data storage system decreases from a value that is greater than or equal to a pre-established warning threshold to a value that is lower than the pre-established warning threshold.

13. The method of claim 12 wherein the predetermined access conditions include, for the particular set of data storage pathways, a minimum percentage of the particular set of data storage pathways that must be available for transferring data between the particular node and the data storage system in order for a determination to be made that the particular set is available for transferring data, and wherein the method further comprises the step of:

providing, as an operation state corresponding to the particular set of data storage pathways, a faulted state when the percentage of the particular set of data storage pathways available for transferring data between the particular node and the data storage system decreases from a value that is greater than or equal to the minimum percentage to a value that is below the minimum percentage, the faulted state indicating to the cluster framework that the particular set of data storage pathways is no longer available for transferring data between the particular node and the data storage system in accordance with the predetermined access conditions.

14. A method for providing access to data storage pathways that connect a cluster of nodes to a data storage system, the method comprising the steps of:

receiving, from a cluster framework operating on the cluster of nodes, instructions for controlling multiple sets of the data storage pathways that connect the cluster of nodes to the data storage system;

determining, in response to the instructions, which of the multiple sets of data storage pathways are available for transferring data between the cluster of nodes and the data storage system in accordance with predetermined access conditions;

providing, to the cluster framework, operation states identifying which of the multiple sets of data storage pathways are available for transferring data between the cluster of nodes and the data storage system in accordance with the predetermined access conditions, the cluster of nodes accessing the data storage pathways based on the operation states; and issuing a warning signal to the cluster framework when a number of a particular set of data storage pathways available for transferring data between a particular node and the data storage system decreases from a value that is greater than or equal to a pre-established warning threshold to a value that is lower than the pre-established warning threshold.

15. The method of claim 14 wherein the predetermined access conditions include, for the particular set of data storage pathways, a minimum number of the particular set of data storage pathways that must be available for transferring data between the particular node and the data storage system in order for a determination to be made that the particular set is available for transferring data, and wherein the method further comprises the step of:

providing, as an operation state corresponding to the particular set of data storage pathways, a faulted state when the number of the particular set of data storage pathways available for transferring data between the particular node and the data storage system decreases from a value that is greater than or equal to the minimum number to a value that is below the minimum number, the faulted state indicating to the cluster framework that the particular set of data storage pathways is no longer available for transferring data between the particular node and the data storage system in accordance with the predetermined access conditions.

16. A computerized cluster for providing access to data storage pathways that connect to a data storage system, the computerized cluster comprising:

multiple sets of data storage pathways that connect to a data storage system; and multiple nodes coupled to the multiple sets of data storage pathways, the multiple nodes being programmed to:

(i) receive, from a cluster framework operating on the multiple nodes, instructions for controlling the multiple sets of the data storage pathways that connect to the data storage system;

(ii) determine, in response to the instructions, which of the multiple sets of data storage pathways are available for transferring data between the multiple nodes and the data storage system in accordance with predetermined access conditions; and (iii) provide, to the cluster framework, operation states identifying which of the multiple sets of data storage pathways are available for transferring data between the multiple nodes and the data storage system in accordance with the predetermined access conditions, the multiple nodes accessing the data storage pathways based on the operation states, wherein each node connects to the data storage system through one of the multiple sets of data storage pathways, and wherein the multiple nodes include:

a pathway resource agent, operating on each node, to supply an operation state indicating whether a set of data storage pathways connecting that node to the data storage system is available for transferring data between that node and the data storage system in accordance with the predetermined access conditions.

17. The computerized cluster of claim 16 wherein the predetermined access conditions include, for a particular set of data storage pathways, a minimum percentage of the particular set of data storage pathways that must be available for transferring data between a particular node and the data storage system in order for a determination to be made that the particular set is available for transferring data, wherein a pathway resource agent operates on each node, and wherein a particular pathway resource agent operating on the particular node includes:

a fault detection routine to provide, as an operation state corresponding to the particular set of data storage pathways, a faulted state when the percentage of the particular set of data storage pathways available for transferring data between the particular node and the data storage system decreases from a value that is greater than or equal to the minimum percentage to a value that is below the minimum percentage, the faulted state indicating to the cluster framework that the particular set of data storage pathways is no longer available for transferring data between the particular node and the data storage system in accordance with the predetermined access conditions.

18. The computerized cluster of claim 16 wherein a pathway resource agent operates on each node, and wherein a particular pathway resource agent operating on a particular node includes:

an input routine to receive, in response to a resource of the data storage system becoming unavailable, a particular instruction from the cluster framework to make a particular set of data storage pathways unavailable for transferring data between a particular node and the data storage system; and an offline routine to provide, in response to the particular instruction and as an operation state corresponding to the particular set of data storage pathways, an offline state to the cluster framework, the offline state indicating to the cluster framework that the particular set of data storage pathways is no longer available for transferring data between the particular node and the data storage system in accordance with the predetermined access conditions.

19. The computerized cluster of claim 16 wherein the predetermined access conditions include, for a particular set of data storage pathways that connect a particular node to the data storage system, a minimum number of the particular set of data storage pathways that must be available for transferring data between the particular node and the data storage system in order for a determination to be made that the particular set is available for transferring data.

20. The computerized cluster of claim 19 wherein the particular node is programmed to:

determine that the particular set of data storage pathways is unavailable for transferring data when (i) less than the minimum number of the particular set of data storage pathways is available to transfer data between the particular node and the data storage system, and (ii) at least one data storage pathway of the particular set of data storage pathways is available to transfer data between the particular node and the data storage system.

21. The computerized cluster of claim 16 wherein the predetermined access conditions include, for a particular set of data storage pathways, a minimum number of the particular set of data storage pathways that must be available for transferring data between a particular node and the data storage system in order for a determination to be made that the particular set is available for transferring data, wherein a pathway resource agent operates on each node, and wherein a particular pathway resource agent operating on the particular node includes:

a fault detection routine to provide, as an operation state corresponding to the particular set of data storage pathways, a faulted state when the number of the particular set of data storage pathways available for transferring data between the particular node and the data storage system decreases from a value that is greater than or equal to the minimum number to a value that is below the minimum number, the faulted state indicating to the cluster framework that the particular set of data storage pathways is no longer available for transferring data between the particular node and the data storage system in accordance with the predetermined access conditions.

22. The computerized cluster of claim 16 wherein each set of data storage pathways of the multiple sets of data storage pathways includes at least two data storage pathways.

23. The computerized cluster of claim 22 wherein each data storage pathway is a point-to-point connection which is configured to carry data between the multiple nodes and the data storage system, and wherein the data storage system is external to the multiple nodes.

24. The computerized cluster of claim 16 wherein the multiple nodes, when determining which of the multiple sets of data storage pathways are available, are configured to:

for a set of data storage pathways, compare a percentage of non-faulted data storage pathways within that set of data storage pathways to a predetermined non-faulted data storage pathway threshold percentage to determine whether that set of data storage pathways is available to carry data.

25. A computerized cluster for providing access to data storage pathways that connect to a data storage system, the computerized cluster comprising:

multiple sets of data storage pathways that connect to a data storage system; and multiple nodes coupled to the multiple sets of data storage pathways, the multiple nodes being programmed to:
  (i) receive, from a cluster framework operating on the multiple nodes, instructions for controlling the multiple sets of the data storage pathways that connect to the data storage system;
  (ii) determine, in response to the instructions, which of the multiple sets of data storage pathways are available for transferring data between the multiple nodes and the data storage system in accordance with predetermined access conditions; and
  (iii) provide, to the cluster framework, operation states identifying which of the multiple sets of data storage pathways are available for transferring data between the multiple nodes and the data storage system in accordance with the predetermined access conditions, the multiple nodes accessing the data storage pathways based on the operation states, wherein the predetermined access conditions include, for a particular set of data storage pathways that connect a particular node to the data storage system, a minimum percentage of the particular set of data storage pathways that must be available for transferring data between the particular node and the data storage system in order for a determination to be made that the particular set is available for transferring data.

26. The computerized cluster of claim 25 wherein the particular node is programmed to:

determine that the particular set of data storage pathways is unavailable for transferring data when (i) less than the minimum percentage of the particular set of data storage pathways is available to transfer data between the particular node and the data storage system, and (ii) at least one data storage pathway of the particular set of data storage pathways is available to transfer data between the particular node and the data storage system.

27. A computerized cluster for providing access to data storage pathways that connect to a data storage system, the computerized cluster comprising:

multiple sets of data storage pathways that connect to a data storage system; and multiple nodes coupled to the multiple sets of data storage pathways, the multiple nodes being programmed to:
  (i) receive, from a cluster framework operating on the multiple nodes, instructions for controlling the multiple sets of the data storage pathways that connect to the data storage system;
  (ii) determine, in response to the instructions, which of the multiple sets of data storage pathways are available for transferring data between the multiple nodes and the data storage system in accordance with predetermined access conditions; and
  (iii) provide, to the cluster framework, operation states identifying which of the multiple sets of data storage pathways are available for transferring data between the multiple nodes and the data storage system in accordance with the predetermined access conditions, the multiple nodes accessing the data storage pathways based on the operation states, wherein a pathway resource agent operates on each node, and wherein a particular pathway resource agent operating on a particular node includes:

a warning routine to issue a warning signal to the cluster framework when a percentage of a particular set of data storage pathways available for transferring data between the particular node and the data storage system decreases from a value that is greater than or equal to a pre-established warning threshold to a value that is lower than the pre-established warning threshold.

28. The computerized cluster of claim 27 wherein the predetermined access conditions include, for the particular set of data storage pathways, a minimum percentage of the particular set of data storage pathways that must be available for transferring data between the particular node and the data storage system in order for a determination to be made that the particular set is available for transferring data, and wherein the particular pathway resource agent further includes:

a fault detection routine to provide, as an operation state corresponding to the particular set of data storage pathways, a faulted state when the percentage of the particular set of data storage pathways available for transferring data between the particular node and the data storage system decreases from a value that is greater than or equal to the minimum percentage to a value that is below the minimum percentage, the faulted state indicating to the cluster framework that the particular set of data storage pathways is no longer available for transferring data between the particular node and the data storage system in accordance with the predetermined access conditions.

29. A computerized cluster for providing access to data storage pathways that connect to a data storage system, the computerized cluster comprising:
multiple sets of data storage pathways that connect to a data storage system; and
multiple nodes coupled to the multiple sets of data storage pathways, the multiple nodes being programmed to:
(i) receive, from a cluster framework operating on the multiple nodes, instructions for controlling the multiple sets of the data storage pathways that connect to the data storage system;
(ii) determine, in response to the instructions, which of the multiple sets of data storage pathways are available for transferring data between the multiple nodes and the data storage system in accordance with predetermined access conditions; and
(iii) provide, to the cluster framework, operation states identifying which of the multiple sets of data storage pathways are available for transferring data between the multiple nodes and the data storage system in accordance with the predetermined access conditions, the multiple nodes accessing the data storage pathways based on the operation states,
wherein a pathway resource agent operates on each node, and wherein a particular pathway resource agent operating on a particular node includes:
a warning routine to issue a warning signal to the cluster framework when a number of a particular set of data storage pathways available for transferring data between the particular node and the data storage system decreases from a value that is greater than or equal to a pre-established warning threshold to a value that is lower than the pre-established warning threshold.

30. The computerized cluster of claim 29 wherein the predetermined access conditions include, for the particular set of data storage pathways, a minimum number of the particular set of data storage pathways that must be available for transferring data between the particular node and the data storage system in order for a determination to be made that the particular set is available for transferring data, and wherein the particular pathway resource agent further includes:
a fault detection routine to provide, as an operation state corresponding to the particular set of data storage pathways, a faulted state when the number of the particular set of data storage pathways available for transferring data between the particular node and the data storage system decreases from a value that is greater than or equal to the minimum number to a value that is below the minimum number, the faulted state indicating to the cluster framework that the particular set of data storage pathways is no longer available for transferring data between the particular node and the data storage system in accordance with the predetermined access conditions.

31. A data storage system for providing access to data storage pathways that connect to a cluster of nodes, the data storage system comprising:
multiple sets of data storage pathways that connect to a cluster of nodes; and
an interface coupled to the multiple sets of data storage pathways, the interface being programmed to:
(i) receive, from a cluster framework operating on the cluster of nodes, instructions for controlling the multiple sets of the data storage pathways that connect to the cluster of nodes;
(ii) determine, in response to the instructions, which of the multiple sets of data storage pathways are available for transferring data between the cluster of nodes and the data storage system in accordance with predetermined access conditions; and
(iii) provide, to the cluster framework, operation states identifying which of the multiple sets of data storage pathways are available for transferring data between the cluster of nodes and the data storage system in accordance with the predetermined access conditions, the cluster of nodes accessing the data storage pathways based on the operation states,
wherein each node connects to the interface through one of the multiple sets of data storage pathways, and wherein the interface is further programmed to:
supply, for each node of the cluster, an operation state indicating whether a set of data storage pathways connecting that node to the data storage system is available for transferring data between that node and the data storage system in accordance with the predetermined access conditions.

32. The data storage system of claim 31 wherein the interface, when determining which of the multiple sets of data storage pathways are available, is configured to:
for a set of data storage pathways, compare a percentage of non-faulted data storage pathways within that set of data storage pathways to a predetermined non-faulted data storage pathway threshold percentage to determine whether that set of data storage pathways is available to carry data.

33. A distributed computer system for providing access to data storage pathways, the distributed computer system comprising:
a data storage system;
multiple sets of data storage pathways that connect to the data storage system; and
multiple nodes coupled to the multiple sets of data storage pathways, the multiple nodes being programmed to:
(i) receive, from a cluster framework operating on the multiple nodes, instructions for controlling the multiple sets of the data storage pathways that connect to the data storage system;
(ii) determine, in response to the instructions, which of the multiple sets of data storage pathways are available for transferring data between the multiple nodes and the data storage system in accordance with predetermined access conditions; and
(iii) provide, to the cluster framework, operation states identifying which of the multiple sets of data storage pathways are available for transferring data between the multiple nodes and the data storage system in accordance with the predetermined access conditions, the multiple nodes accessing the data storage pathways based on the operation states,
wherein each node connects to the data storage system through one of the multiple sets of data storage pathways, and wherein each of the multiple nodes has:
a pathway resource agent, operating on that node, to supply an operation state indicating whether a set of data storage pathways connecting that node to the data storage system is available for transferring data between that node and the data storage system in accordance with the predetermined access conditions.

34. The distributed computer system of claim 33 wherein the multiple nodes, when determining which of the multiple sets of data storage pathways are available, is configured to:

for a set of data storage pathways, compare a percentage of non-faulted data storage pathways within that set of data storage pathways to a predetermined non-faulted data storage pathway threshold percentage to determine whether that set of data storage pathways is. available to carry data.

35. A computerized cluster for providing access to data storage pathways that connect to a data storage system, the computerized cluster comprising:

multiple sets of data storage pathways that connect to a data storage system; and multiple nodes coupled to the multiple sets of data storage pathways, the multiple nodes including pathway resource means for:

(i) receiving, from a cluster framework operating on the multiple nodes, instructions for controlling the multiple sets of the data storage pathways that connect to the data storage system;

(ii) determining, in response to the instructions, which of the multiple sets of data storage pathways are available for transferring data between the multiple nodes and the data storage system in accordance with predetermined access conditions; and (iii) providing, to the cluster framework, operation states identifying which of the multiple sets of data storage pathways are available for transferring data between the multiple nodes and the data storage system in accordance with the predetermined access conditions, the multiple nodes accessing the data storage pathways based on the operation states, wherein each node connects to the data storage system through one of the multiple sets of data storage pathways, and wherein the pathway resource means includes:

means for supplying, to a portion of the cluster framework operating on each node, an operation state indicating whether a set of data storage pathways connecting that node to the data storage system is available for transferring data between that node and the data storage system in accordance with the predetermined access conditions.

36. The computerized cluster of claim 35 wherein the multiple nodes, when determining which of the multiple sets of data storage pathways are available, is configured to:

for a set of data storage pathways, compare a percentage of non-faulted data storage pathways within that set of data storage pathways to a predetermined non-faulted data storage pathway threshold percentage to determine whether that set of data storage pathways is available to carry data.

37. A computer program product that includes a computer readable medium having commands stored thereon for providing access to data storage pathways that connect a cluster of nodes to a data storage system such that the commands, when processed by the cluster of nodes, cause the cluster of nodes to perform the steps of:

receiving, from a cluster framework operating on the cluster of nodes, instructions for controlling multiple sets of the data storage pathways that connect the cluster of nodes to the data storage system;

determining, in response to the instructions, which of the multiple sets of data storage pathways are available for transferring data between the cluster of nodes and the data storage system in accordance with predetermined access conditions; and providing, to the cluster framework, operation states identifying which of the multiple sets of data storage pathways are available for transferring data between the cluster of nodes and the data storage system in accordance with the predetermined access conditions, the cluster of nodes accessing the data storage pathways based on the operation states, wherein each node connects to the data storage system through one of the multiple sets of data storage pathways, and wherein the step of providing includes the step of:

supplying, for each node, an operation state indicating whether a set of data storage pathways connecting that node to the data storage system is available for transferring data between that node and the data storage system in accordance with the predetermined access conditions.

38. The computer program product of claim 37 wherein the cluster of nodes, when determining which of the multiple sets of data storage pathways are available, is configured to:

for a set of data storage pathways, compare a percentage of non-faulted data storage pathways within that set of data storage pathways to a predetermined non-faulted data storage pathway threshold percentage to determine whether that set of data storage pathways is available to carry data.

* * * * *

UNITED STATES PATENT AND TRADEMARK OFFICE
CERTIFICATE OF CORRECTION

PATENT NO. : 6,526,521 B1  Page 1 of 1
DATED : February 25, 2003
INVENTOR(S) : James B. Lim It is certified that error appears in the above-identified patent and that said Letters Patent is hereby corrected as shown below:

<u>Column 19,</u>
Line 66, "the-data" should read -- the data --

<u>Column 29,</u>
Line 12, "is." should read -- is --

Signed and Sealed this

Sixteenth Day of December, 2003

JAMES E. ROGAN
*Director of the United States Patent and Trademark Office*